(12) United States Patent
Harper, Jr.

(10) Patent No.: US 11,421,873 B2
(45) Date of Patent: Aug. 23, 2022

(54) METHOD FOR CO-PRODUCTION OF HYPER-EFFICIENT ELECTRIC POWER AND A METHANE SIDESTREAM FROM HIGH $CO_2$ NATURAL GAS SOURCES WITH OPTIONAL INTEGRATED LNG PRODUCTION AND POWER STORAGE

(71) Applicant: Harper Biotech LLC, Villanova, PA (US)

(72) Inventor: Charles L. Harper, Jr., Villanova, PA (US)

(73) Assignee: Harper Biotech LLC, Villanova, PA (US)

( * ) Notice: Subject to any disclaimer, the term of this patent is extended or adjusted under 35 U.S.C. 154(b) by 112 days.

(21) Appl. No.: 16/715,352

(22) Filed: Dec. 16, 2019

(65) Prior Publication Data

US 2020/0191386 A1    Jun. 18, 2020

Related U.S. Application Data

(60) Provisional application No. 62/780,228, filed on Dec. 15, 2018.

(51) Int. Cl.
  *F23D 14/02* (2006.01)
  *F25J 3/02* (2006.01)
  (Continued)

(52) U.S. Cl.
  CPC ......... *F23D 14/02* (2013.01); *B01D 19/0042* (2013.01); *C02F 1/20* (2013.01);
  (Continued)

(58) Field of Classification Search
  CPC .................................. F23D 14/02; F25J 3/02
  See application file for complete search history.

(56) References Cited

U.S. PATENT DOCUMENTS 753,045 A    2/1904  Cooper
1,113,096 A   10/1914  Bosch et al.
(Continued)

FOREIGN PATENT DOCUMENTS

BE        531780      9/1954
EP      2528192 B1    6/2016
EP      3061515 B1    3/2017

OTHER PUBLICATIONS

Allam et al. (2017). Demonstration of the Allam Cycle: An update on the development status of a high efficiency supercritical carbon dioxide power process employing full carbon capture. Energy Procedia, 114, 5958-5966.

(Continued)

*Primary Examiner* — Youngsul Jeong
(74) *Attorney, Agent, or Firm* — Caesar Rivise, PC

(57) ABSTRACT

A gas separation and utilization method includes the steps of: (a) providing an ascending flow of a liquid containing carbon dioxide gas and methane gas; (b) extracting at least a fraction of the methane gas from the liquid to provide a methane enriched gas; (c) extracting at least a fraction of the carbon dioxide gas from the liquid to provide a carbon dioxide enriched gas, which is extracted from the ascending flow of the liquid downstream of the methane enriched gas; (d) collecting the methane enriched gas; (e) feeding the carbon dioxide enriched gas as a fuel into an oxyfuel power generation system; (f) generating power from the oxyfuel power generation system; and (g) expelling an exhaust from the oxyfuel power generation system, wherein the exhaust comprises carbon dioxide and water vapor. A system configured to perform the method and a grid balancing method using the system are also disclosed.

14 Claims, 11 Drawing Sheets

(51) Int. Cl.
   *C02F 1/20*   (2006.01)
   *B01D 19/00*  (2006.01)
   *C10L 3/10*   (2006.01)
(52) U.S. Cl.
   CPC .............. *C10L 3/104* (2013.01); *F25J 3/0209* (2013.01); *F25J 3/0233* (2013.01); *F25J 3/0266* (2013.01); *C10L 2290/544* (2013.01)

(56) References Cited

U.S. PATENT DOCUMENTS

| | | | |
|---|---|---|---|
| 1,113,097 A | 10/1914 | Bosch et al. | |
| 1,157,669 A | 10/1915 | Bosch et al. | |
| 3,097,917 A | 7/1963 | Dotts et al. | |
| 3,306,057 A * | 2/1967 | Harmens | F25J 3/0266 62/629 |
| 4,235,607 A | 11/1980 | Kinder et al. | |
| 4,239,510 A | 12/1980 | Hays et al. | |
| 4,995,234 A | 2/1991 | Kooy et al. | |
| 5,224,336 A * | 7/1993 | Agrawal | F25J 3/04351 62/656 |
| 5,364,611 A | 11/1994 | Iijima et al. | |
| 6,881,389 B2 | 4/2005 | Paulsen et al. | |
| 8,312,738 B2 | 11/2012 | Singh et al. | |
| 8,490,556 B2 | 7/2013 | Yamada et al. | |
| 8,596,075 B2 | 12/2013 | Allam et al. | |
| 8,764,885 B2 | 7/2014 | Baxter et al. | |
| 9,250,012 B2 | 2/2016 | Baxter | |
| 9,339,760 B2 | 5/2016 | Kennedy et al. | |
| 9,410,736 B2 | 8/2016 | Baxter | |
| 9,718,702 B2 | 8/2017 | Harper | |
| 9,732,671 B2 | 8/2017 | Harper | |
| 10,018,115 B2 | 7/2018 | Allam et al. | |
| 10,254,041 B2 * | 4/2019 | Van Roosmalen | F25J 3/0635 |
| 2007/0231244 A1 | 10/2007 | Shah et al. | |
| 2015/0354451 A1 * | 12/2015 | Harper, Jr. | F23L 7/007 60/783 |
| 2016/0250584 A1 | 9/2016 | De Godos Crespo et al. | |
| 2016/0257577 A1 * | 9/2016 | Harper, Jr. | F03B 17/06 |
| 2017/0341942 A1 | 11/2017 | Harper | |

OTHER PUBLICATIONS

Antares Offshore LLC, screen capture of http://www.antaresoffshore.com/projects.php from the Internet archive dated Apr. 23, 2017.
Ausfelder et al. "Energy storage as part of a secure energy supply." ChemBioEng Reviews 4, No. 3 (2017): 144-210.
Ausubel. (2004). Big Green Energy Machines. The Industrial Physicist, 20-24.
Bahr et al. "Microalgal-biotechnology as a platform for an integral biogas upgrading and nutrient removal from anaerobic effluents." Environmental science & technology 48, No. 1 (2014): 573-581.
Bikumu. (2005). La problematique du deficit energetique dans la sous region des Grands—Las africains.
Budzianowski et al. "Power requirements of biogas upgrading by water scrubbing and biomethane compression: comparative analysis of various plant configurations." Energy conversion and management 141 (2017): 2-19.
"KivuWAtt Animation", FMO: Entrepreneurial Development Bank, video retrieved on May 5, 2021 from https://www.youtube.com/watch?v=N3PHPHyRxjE.
"Contour Global/KivuWatt", ImageMaker, Inc., video retrieved on May 5, 2021 from https://vimeo.com/74334165.
"Kivuwatt", Contour Global, retrieved on May 5, 2021 from http://www.contourglobal.com/asset/kivuwatt.
Marin et al. "Influence of liquid-to-biogas ratio and alkalinity on the biogas upgrading performance in a demo scale algal-bacterial photobioreactor." Bioresource technology 280 (2019): 112-117.
Maqsood, et al., (2014). Cryogenic carbon dioxide separation from natural gas: a review based on conventional and novel emerging technologies. Rev. Chem. Eng., v. 30 (5): 453-477.
Munoz et al. "A review on the state-of-the-art of physical/chemical and biological technologies for biogas upgrading." Reviews in Environmental Science and Bio/Technology 14, No. 4 (2015): 727-759.
Oosterdijk. et al., (2012). Lake Kivu: Turning threat into prosperity. TCE, The Chemical Engineer, issue 852, pp. 32-35.
Rodero et al. (2019). Technology validation of photosynthetic biogas upgrading in a semi-industrial scale algal-bacterial photobioreactor. Bioresource Technol., 279: 43-49.
Tietze (1980). The Unique Methane Gas Deposit in Lake Kivu (Central Africa)—Stratification, Dynamics, Genesis and Development. In: Unconventional Gas Recovery Symposium, SPE/DOE8957 (Society of Petroleum Engineers), pp. 275-288.
Tietze (2000). Lake Kivu Gas Development and Promotion-Related Issues: Safe and Environmentally Sound Exploitation. Final Report to the Ministry of Energy, Water and Natural Resources Unit for Promotion and Exploitation of Lake Kivu Gas. 110pp. Republic of Rwanda, Ministry of Energy, Water and Natural Resources.
Tietze (2007). Basic plan for monitoring, regulating and steering exploitation of the unique methane gas deposit in Lake Kivu: Safely, Environmentally soundly and with optimal yield. Copyright, PDT GmbH / Dr Klaus Tietze, Celle, Germany, 1-201.
Wuest et al. "Modelling the reinjection of deep-water after methane extraction in Lake Kivu." EAWAG and BTC for the Governments of Rwanda and DR Congo 141 (2009).
Wuest et al. (2012). Methane Formation and Future Extraction in Lake Kivu. In: J.-P. Descy et al. (eds.), Lake Kivu: Limnology and Biochemistry of a Tropical Great Lake. Aquatic Ecology Series v. 5. Springer, 165-180.
Wylock et al. (2017). Performance evaluation of biogas upgrading by pressurized water scrubbing via modelling and simulation. Chem. Eng. Sci., 170: 639-652.
English Translation of abstract of EP 2528192 B1.
Machine Translation of BE 531780.
International Search Report for PCT/US2019/066555 dated Mar. 10, 2020.
Machine Translation of "Introduction" Bikumu (2005) article.
Antares Offshore LLC, http://www.antaresoffshore.com/images/kivuwattlarge.jpg (2015).
Antares Offshore LLC, http://www.antaresoffshore.com/images/floaterimage6.jpg (2015).

* cited by examiner

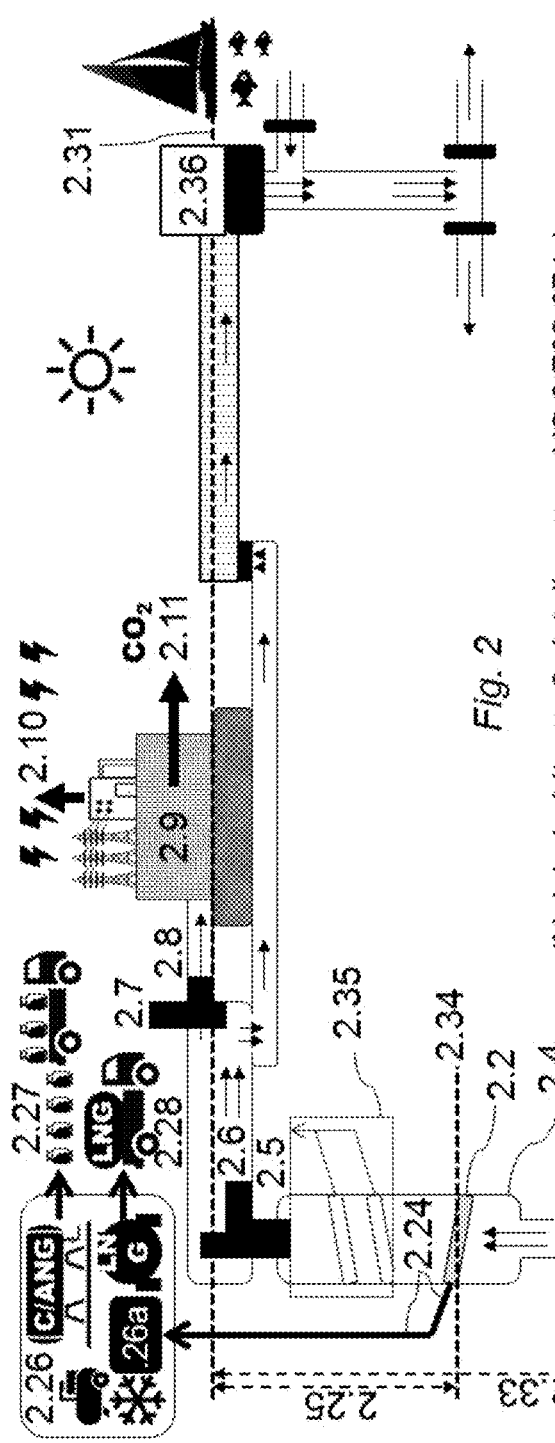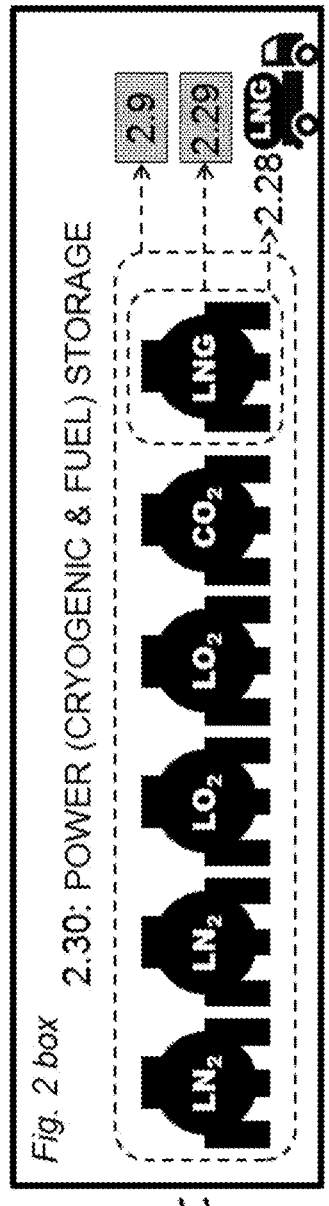
Fig. 2

METHOD FOR CO-PRODUCTION OF HYPER-EFFICIENT ELECTRIC POWER AND A METHANE SIDESTREAM FROM HIGH $CO_2$ NATURAL GAS SOURCES WITH OPTIONAL INTEGRATED LNG PRODUCTION AND POWER STORAGE

CROSS-REFERENCE TO RELATED APPLICATIONS

This application claims the benefit of U.S. Provisional Patent Application No. 62/780,228, filed Dec. 15, 2018, the contents of which are incorporated herein by reference in their entireties for all purposes.

BACKGROUND OF THE INVENTION

1. Field of Invention

The field of the invention falls broadly within a specialized field of integrative greentech combining oxyfuel natural gas power generation with production-purification of natural gas (NG and/or LNG), utilizing high-$CO_2$ gas sources, with additional aspects including power storage and related grid-balancing power output control capacities allowing integration of irregular inputs from renewable electric power sources as well as integration of "solar fuels" co-production if/as desired. In view of integrated gas extractive-processing steps, the field of the invention falls even more narrowly within the field of methods, systems and apparatus for efficient extraction and utilization of Lake Kivu (-type) deepwater gas resources. The invention is not limited to Lake Kivu application only. Other applications are possible such as development of $CO_2$-contaminated gas from offshore oil and gas reserves, e.g., for offshore: Natuna, Indonesia. Land-based practice of the invention also is possible. The invention is not a "gas cleaning" method of natural gas purification, though it includes a partial cleaning process of $CO_2$ partitioning. It is more complex. It solves a different problem as disclosed herein. It transforms the problem of excessive $CO_2$ accompanying methane ($CH_4$) into a positive aspect of power generation efficiency. The invention serves to promote innovation in the new $CO_2$ utilization economy as well as in the new economy of efficient power storage required for effective grid integrations of renewables.

2. Description of Related Art

Problems the invention solves are summarized by two related questions focused on global-scale environmental goals. I: What possibilities for greentech innovation arise from commercialization of Zero Emission Power Plant (ZEPP) technology, specifically Allam's Supercritical $CO_2$ Power Cycle oxyfuel turbine power generator fueled by natural gas (NG), considering especially the favorability of this type of turbine for intake of $CO_2$-contaminated natural gas, its impressively high thermal efficiency, and its hyper-compact scale (which is likely eventually to drive superior cost competition)? II: Recognizing that replacement of coal by NG is at present driving the world's largest-scale reductions in $CO_2$ emissions, can key "greentech" development goals be advanced if large-scale $CO_2$-utilization industries have the potential to develop profitably in coordination with worldwide expansion of the NG economy (that is, by utilizing the new ZEPP turbine technology)?

An important contemporary task is developing very large-scale industries that utilize $CO_2$ on massive scales. $CO_2$ utilization can be a useful approach to the global $CO_2$ problem only if utilization volumes have potential to scale into the range of billions of tonnes (=gigatons, GT) per annum in so far as the scale of accumulation in the atmosphere is approaching ~20 GT $CO_2$/yr. Residence times for fixed carbon also must not be short, as for food crops, unless there is substantial associated carbon fixation (which is possible in some forms of crop agriculture). Problematic fuels v. foods trade-off (as for most biofuels) should be avoided. Industry areas fitting these criteria are quite limited according to the gigantic scale requirement. They may chemically "fix" the carbon present in $CO_2$ into inorganic substances produced on massive scales globally such as cements/concretes but with modification towards $CO_2$-absorbing Mg-based cementitious chemistries not based on quicklime, CaO, obtained by burning limestone, $CaCO_3$, (into $CaO+CO_2$). Or they may increase very large scale economic agro-production (including forestry) based on photosynthetic transformation of $CO_2$ into organic matter. Examples include the following overlapping categories: (i) mass-scale bioproduction activities that co-produce soil carbon (e.g., involving productivity-enhancing soil restoration practices such as Adaptive Multi-Paddock Grazing, AMPG and soil-regenerative high-productivity agriculture); (ii) the creation of new productive standing biomass such as fruit tree mega-orchards and commercial forests, (and/or re-wilding and/or de-desertification forestry), especially if developed on lands that otherwise do not, or did not, store carbon; and (iii) mass-scale production of a variety of structural fabrication products utilizing carbon-containing materials such as wood products, organic and carbon fiber-based strengtheners, fabrics, ropes and fabrications, and bioplastics; also some modes of biochar-biofuel and soil-biofuel co-production. The development and rapid expansion of industries of this type on a massive scale is a non-trivial challenge. Strong profitability is fundamentally important for rapid growth on very large scales.

Thus far, directly measurable progress in $CO_2$ utilization on the largest scale, ironically, is within the fossil fuel industry. The world's largest mode of direct $CO_2$ utilization, approaching ~100 million tonnes per year, is $CO_2$ injection into oilfields for Enhanced Oil Recovery (EOR). Also, the most consequential decrease in per capita $CO_2$ emissions in any large country has been another aspect of the fossil fuel industry. Per capita $CO_2$ emissions have decreased in recent decades in the USA due to very rapid development of the new natural gas (NG) economy accelerated by the invention of shale gas fracking (cf., Smil, 2015; Mills, 2018). Plentiful low-cost NG has displaced coal rapidly within the US energy mix, decreasing $CO_2$ emissions by roughly 44% on a per-BTU basis. Expansion of NG production and use in power generation displacing coal in other countries (especially in India and China) represents a potent potential aspect of success addressing the global $CO_2$ challenge.

NG-based power technologies that auto-capture combustion-generated $CO_2$, offer special potential. Such technologies are particularly important if they can facilitate profitable integration (and grid-management) of inputs of temporally-irregular renewable electric power into the very large scale economic domains of "prime mover" mega-technologies (Smil, 2005; 2010) such as turbine-based powerplants and via production of (for example electro-synthetic) fuels that supply fuel for transportation engines. This disclosure teaches methods and systems towards this end, especially by inclusion of innovative new sub-methods and sub-subsystems including Allam's supercritical $CO_2$ power cycle oxyfuel turbine and various closely related cryogenic methods of gas separation, gas cleaning, and power storage.

The expanding natural gas economy is part of an innovation revolution that includes a recent history-transforming advance in greentech turbine design. The dream of a gas-powered Zero Emission Power Plant "ZEPP" (Ausubel, 2004) has been realized by commercialization of Rodney Allam's Supercritical $CO_2$ Power Cycle turbine design (U.S. Pat. No. 8,596,075; Patel, 2019; McMahon, 2019; Conca, 2019) by the company NET Power (www.NETpower.com) and collaborating companies including the turbine manufacturer Toshiba. The thermal efficiency of NET Power's first-generation commercial engines manufactured by Toshiba appears to be ~59% (net of the parasitic energy cost of cryogenic $O_2$ production estimated at ~8% of power output). ASPEN modeling results are provided in several NET Power slide decks (Allam et al., 2017; NET Power, various) and additionally in several independent analyses (e.g., Penkhun and Tsatsaronis, 2016; Ferrari et al., 2017; Scaccabarozzi et al., 2017). Publication of direct measurements is awaited. Improvements to thermal efficiencies perhaps exceeding 63% seem not unreasonable via some process integrations with processes which can produce flows of pure and enriched $O_2$ such as, for example, water hydrolysis obtaining hydrogen for (e.g., solar) electrofuels production as well as different modes of controlled biological and artificial photosynthesis, (all utilizing $CO_2$ as $C_1$ carbon source).

An oxyfuel ZEPP design creates waste output in the form of pure water and nearly pure $CO_2$ without need for separation from $N_2$. Carbon dioxide output from an Allam type oxyfuel ZEPP can be integrated into a $CO_2$ Utilization Hub according to methods and systems I disclosed in US 2017/034192 A1, where these methods and systems provide teachings that are integrated with innovative gas extractive art where high-$CO_2$ gas originates from an underwater natural source location (as also is taught in my disclosures: U.S. Pat. Nos. 9,732,671, 9,718,702). These methods and systems also show how power storage capacities (including grid-balancing integration of irregular power inputs from renewable sources) additionally can be integrated into Allam type oxyfuel ZEPP powerplants. This application builds upon the disclosure of US 2017/0341942 A1 by describing how such capacities may efficiently be expanded into very large-scale power storage capacities by means of natural gas separation and storage.

As detailed in my previous disclosures (U.S. Pat. Nos. 9,732,671, 9,718,702, and US 2017/0341942 A1), Lake Kivu offers an especially attractive situation for developing advanced green technologies linking oxyfuel ZEPP technology with mass-scale $CO_2$ utilization. The remoteness of Lake Kivu from seaports creates the equivalent of a large subsidy for production of power, fuels and many types of products. Purified $CO_2$ in large quantities can be available for industrial use at low cost. And the wider region has spectacular potential for large-scale, low-cost, grid-integrated, solar power production if (and only if) low-cost power storage can become available, which a Lake Kivu $CO_2$ Utilization Hub allows.

Inventive art most closely related to the present disclosure is presented in a 1954 Belgian patent BE 531780, and in my related disclosure: U.S. Pat. No. 9,732,671 (wherein an extensive discussion of broadly related art is provided with many patent references cited and briefly described in columns 5 and 6). BE 531780 was developed in association with the design and construction of Lake Kivu deepwater gas extraction and purification operations. The patent teaches a method for scrubbing most of the accompanying $CO_2$ in order to purify a desired methane component to be used to fuel boilers. BE 531780 teaches a method of purification of methane from accompanying contaminating $CO_2$ by degassing greater than 90% of the methane present in an auto-siphoning, bubble-degassing, up-flow of Lake Kivu's deepwater flowing upwards within a pipe. BE 531780 teaches a method of extractive separation of a single flow of extracted methane gas initially by gas/water (and partially $CH_4$ from $CO_2$) separation at a relatively shallow depth of 16 meters depth within the lake. BE 531780 does not teach a method of extractive splitting of two or more partitioned flows of methane provided into separated and differing modes of methane (and $CO_2$) utilization. (No known related art teaches such a method and/or system.) Additional details of the context of the teaching of BE 531780 are provided in subsequent sections.

My teaching disclosed in U.S. Pat. No. 9,732,671 includes a sub-method and sub-system of extraction of degassing bubbles flowing upwards within a depressurizing pipeflow of Lake Kivu deepwater. The flux of degassed gas in these rising bubbles is extracted at depth(s) by one or more bubble traps. Gas/water separation by this means is described in column 16, after line 58, and in columns 19 and 20 in lines 57-67 and 1-9, respectively, and illustrated in FIG. 2 and FIG. 4 as a set of vectors labeled 4b. The sub-method and sub-system does not effectuate a process path spitting of methane flux into differently directed process streams (utilization paths). The sub-method disclosed in U.S. Pat. No. 9,732,671 differs from process path "splitting." The flux separation(s) that one or more bubble traps effectuate assist overall methane degassing efficiency within an overall process described as "total degassing." (The method separates away methane in stages as a means to increase the efficiency of the final separation stage by decreasing the methane concentration of the separated gas so that partitioning "slip" loss into the water phase will be decreased.) All separated methane streams disclosed in U.S. Pat. No. 9,732,671 are shown to be re-united at or near to the surface of the water column (Lake Kivu). They are reunited into a common single united processing path directing degassed gas into a single flow into combustion. This single stream directs all degassed $CH_4$ and $CO_2$ into one single admixed utilization for power production via oxyfuel combustion. There is no explicit teaching of separated process steps for bubble-trapped gas flow(s) obtained at depth relative to final stage degassing obtained near to the surface of the lake.

Several additional disclosures teach methods utilizing the pressure-scaled vertical aspect of bodies of water as a means for scrubbing $CO_2$ out of $CO_2$-contaminated ("acid") natural gas or biogas. See, e.g., U.S. Pat. Nos. 753,045, 3,097,917, 4,235,607, 4,239,510, 5,364,611 and 6,881,389. None of these patents, however, utilize depressurization-degassing of dissolved gas to split $CO_2$-contaminated natural gas into two (or more) methane-containing flux components with one component being partially scrubbed of $CO_2$ and the other possessing a corresponding (mass-balanced) higher degree of $CO_2$ contamination ($CO_2/CH_4$ ratio) relative to the source.

Water-based methods for cleaning associated $CO_2$ from methane, both low- and high-pressure, are well-known especially in biogas upgrading (e.g., Malmberg website, several undated URL items). With the exception of practices developed for Lake Kivu applications, however, these methods do not utilize methods of degassing-based gas/water separation by bubble-trapping in depressurizing up-flows. (For overviews, see: Budzianowski et al. 2017; Wylock and Budzianowski, 2017 and references cited therein). For reference, use of pressurized water for separating $CO_2$ from other gases has been a well-established technology for over a century. Separation of $CO_2$ from $H_2$ was an aspect of advances in industrial gas production in the early $20^{th}$ century, for example in relation to the water gas "Wasserstoffkontactverfahren" process of industrial production of $H_2$ developed by Wild and Bosch in ~1911-1914 (cf., Stranges, 1984; Smil, 2006; and U.S. Pat. Nos. 1,113,096, 1,113,097; also 1,157, 669 for specific mention of water-based removal of $CO_2$). $CO_2$ separations involved in all of such water-based methods of $CO_2$-dissolution into water, however, do not utilize depressurization-degassing stages for primary separation of one input of a methane-containing gas flow with associated $CO_2$ into two different methane-containing gas flow output components. Nor is depressurization-degassing utilized as a means of gas flow component splitting in the method of Crespo et al., in EP 3,061,515B1 and US2016/0250584A1 which utilizes a bubble column organized so that injected bubbles near to the bottom of the column proceed upwards within a water counterflow that flows downwards. Nor is depressurization-degassing gas flow component splitting utilized in the method of Kennedy et al., in U.S. Pat. No. 9,339,760 which also utilizes a bubble column. Nor is depressurization-degassing gas flow component splitting utilized in the photosynthetic biogas upgrading method developed by Raul Munoz and colleagues described in Bahr et al., (2014), Rodero et al., (2019), and Marin et al., (2019) and which utilizes a bubble column with upward flux of both input biogas bubbles and microalgal broth culture within a short (up to ~4 meters high) vertical column.

The offshore Indonesian East Natuna gas field is one of the world's largest known undeveloped gas reserves. Its estimated recoverable methane reserves are ~50 trillion cubic feet. The field, however, has long been considered uneconomic. This is due to the high $CO_2$ content of its gas at ~71% by volume. Local injection-sequestration of $CO_2$ is possible, but the cost burden is prohibitive. (For an overview, cf., Batubara et al., 2015 and references therein.) Environmental-ethical responsibility disallows venting. East Natuna potentially offers one of the world's best opportunities for demonstration of greentech innovation that flips the economic logic by co-development of NG together with $CO_2$ as co-contributors to profitability. This will require innovative and very large-scale $CO_2$ utilization via fixation-transformation of $CO_2$ into profitable products. Because of its large scale and ocean location in SE Asia, Natuna offers one of the world's most significant strategic locations for building-up a new $CO_2$ utilization economy in direct connection with the world's rapidly growing NG economy (and possibly with large-scale, ocean-based, solar power greentech as well). Natuna's $CO_2$ also could be utilized for EOR to revitalize old oilfields in the region. The present disclosure offers a way forward with an aim to advance global environmental responsibility. Natuna is a problem that the invention solves for advancing that aim.

Rwanda is the most densely populated country in Africa. Though modernizing rapidly, wood burning remains the dominant energy source (~80%) if heating and cooking for homes and businesses are included. Indoor brushwood cooking remains common in poorer homes. There is a consequent burden of respiratory diseases especially affecting women and children. Continued wood use is a matter of crisis. The Rwandan economy is rapidly and excitingly growing and developing with expanding per capita energy use. Present demand for wood is estimated to exceed sustainable supply by roughly a factor of two (Rwanda Water and Forestry Authority, 2017), driving a deforestation crisis. This is especially unwelcome in a country possessing magnificent mountain terrains where eco-tourism has become one of the nation's largest sources of foreign income. Ecotourism in Rwanda has tremendous expansion potential long-term especially if the quality of the natural environment is improved rather than degraded. Present wood use for energy in Rwanda is estimated to be about 6 million tonnes per annum. This is equivalent to a thermal energy production of 80 million GJ/yr. Transition to use of LPG cooking gas has been limited. No national or regional supply exists. Recent imports from the Middle East have been at ~10,000 tonnes per annum, equivalent to 0.5 million GJ/yr. National electric power consumption is ~200 MW, equivalent to ~6.3 million GJ/yr. Hence a pressing challenge for Rwanda is transitioning its energy economy away from wood-fuel utilization and towards an environmentally sustainable energy mix that avoids a burden of disease caused by wood-smoke inhalation. The Rwandan Government recognizes deforestation as a pressing challenge. It is promoting transition to LPG for home cooking. Uptake, however, is hindered by high cost for imported LPG gas and equipment. Breakthrough transitions are needed. It will be preferable if new energy sources can be obtained locally and at low cost. Rapid development of high-yield agroforestry offers a necessary but ultimately temporary solution. Lake Kivu's natural gas reserve is available in principle. Due to high levels of accompanying $CO_2$, however, Lake Kivu's gas requires extensive $CO_2$ scrubbing to be used for most purposes other than power generation using the new methods I have disclosed.

Lake Kivu is a lake in the center of Africa shared by the Republic of Rwanda and the Democratic Republic of Congo. Lake Kivu contains abundant dissolved gas in its depths. Lake Kivu's main methane (biogas) reserve known as the Main Resource Zone, MRZ exists below 250 meters depth. Dissolved methane ($CH_4$) of about 32 million tons is present along with dissolved carbon dioxide ($CO_2$) of about 430 million tons (Tietze, 1978, 1980 a,b; Wuest et al., 2009, 2012; Tassi et al. 2009). Dissolved deepwater gas below 250 meters has a molar ratio roughly estimated to be: $CO_2/CH_4$ ~5, though there are unresolved uncertainties over actual abundances and their potential horizontal spatial variability and time rates of increase (Schmid et al., 2004, 2005; King et al., 2006; Tietze, 2007; Wuest et al., 2012; Vaselli et al., 2015). Higher level resource layers known as the "Potential Resource Zone" (PRZ) and "Intermediate Zone" (IZ) contain additional methane biogas reserves of ~6 and ~9 million tonnes, respectively. These reserves are increasing slowly over time, possibly by as much as a few percent per decade. Lake Kivu's deepwater also is nutrient-rich with a chlorine-poor bicarbonate chemistry. It contains abundant Mg, Ca, Na and K bicarbonates. These dominate the total dissolved solids (and excess density preserving stability against convective degassing of the gas-rich deepwater MRZ reservoir) at roughly 5 grams per liter (Tassi et al. 2009). Descy et al., (2012) provides overview perspectives on Lake Kivu. Some other lakes exist that are broadly of this type, as described by Issa et al., (2013). These lakes, however, are far smaller. Their resource volumes are not economically significant.

The most efficient methods for obtaining power from high-$CO_2$ gas utilize an "oxyfuel" combustion turbine method (for example: Kapteijn et al., 2012; Henni, 2012). Oxyfuel turbines do not require pre-separation of $CO_2$ from $CH_4$ for efficient power generation. The most advanced method obtains a strikingly superior performance from the "Supercritical $CO_2$ Power Cycle" dynamics disclosed by the British inventor Rodney Allam (U.S. Pat. No. 8,596,075). Allam's design was realized in 2018 on a 25 MW commercial scale via a test powerplant in Houston Tex. The realization was by Toshiba (manufacturing the turbine) in partnership with NET Power, 8 Rivers, Exelon, and other collaborating companies (Allam et al., 2017; Tollefson, 2018). Oxyfueled "Allam Cycle" power generation from natural gas benefits from the absence of air-derived $N_2$ in the turbine flow. The Allam Cycle uses $CO_2$ inflow additional to $CH_4$ and $O_2$ fuel input. Oxy-combustion generates additional $CO_2$ (with $H_2O$) such that $CO_2$ comprises the main thermodynamic working fluid of the turbine. The gas flow is dominated by $CO_2$ passing through PT trajectories mostly within the supercritical state. Under these conditions, power transfer to rotation occurs at higher densities than in flows in conventional gas-fired turbines with oxygen supplied in the conventional manner by intake of air. The Allam Cycle method yields rotary power at both higher power efficiencies and at much more compact scales than in normal air-fed gas turbines. A high intake of $CO_2$ is required for optimal function. An intake ratio $CO_2/CH_4$ ~5 (mole ratio) is not high enough. Optimal thermal efficiency functioning of the turbine requires an ~5× higher intake ratio into the combustor: $CO_2/CH_4$ ~27 (mole ratio; mass ratio: ~75). Intake mass fractions for optimal combustion are: $CO_2/O_2/CH_4$: 94%/ 4.74%/1.25%, (NET Power, several web-published slide decks referenced). Therefore, even for a Lake Kivu composition intake, recycling of $CO_2$ from the turbine exhaust is required (after removal of combustion-generated water). Therefore, what was once a problem is now a benefit for Allam Cycle combustion using supercritical $CO_2$ (Sc—$CO_2$) as a working fluid. The situation of associated $CO_2$ causing inefficiencies in power generation is now a situation where efficiency increases from having more $CO_2$, much more, in the intake! Allam Cycle fueling therefore is insensitive to levels of associated $CO_2$ in fuel intake. Levels of associated $CO_2$ can be increased up to a factor-of-5 for Lake Kivu's deepwater composition (to $CO_2/CH_4$=27.3 molar) to reach a remarkably high optimal net thermal efficiency factor, eta, in gas turbine power generation using Sc—$CO_2$ Allam Cycle thermodynamics, (including ASU power demand): $\eta_{th}$=59% (NET Power, various). For comparison, this level of efficiency is an ~37% improvement ((0.59−~0.43)/(~0.43)) upon what previously has been realized on Lake Kivu by conventional (reciprocating piston) gas engines fueled by gas processed for $CO_2$ removal by multi-stage processes ($\eta_{th}$~43%). Exhaust $CO_2$ recycling is incorporated into the design of the Allam Cycle system realized and tested by NET Power and its coalition collaborators in 2018.

The "Allam Cycle" method of power generation possesses a very important environmental benefit. It captures both associated $CO_2$ and combustion-generated $CO_2$ in a nearly pure stream. I disclosed many and various benefits for $CO_2$ capture at Lake Kivu in US 2017/0341942 A1 and in U.S. Pat. No. 9,718,702 B2.

Lake Kivu's total available dissolved methane reserve can provide approximately 1,500 megawatts continuous power for the whole of the lake over a period of 30 years if extracted and combusted using high-efficiency methods. With conventional methods, however, roughly only one third as much power will be available. The difference is a consequence of the multiplicative effect of five different individual factors of relative efficiency difference. Expressed as ratios comparing standard with respect to new methods, these factors are: 1. Methane lost as a consequence of $CO_2$ separation operations (0.70/0.99:0.71); 2: (In)accessibility of methane in secondary reservoirs (PRZ, IZ) with lower methane concentrations (32 MT/>38 MT: <0.84); 3: Thermal efficiency in power production (0.43/0.59:0.73); 4: $CO_2$ removal processing energy (~<0.88/~0.94: ~0.94); and 5: Late-stage resource inaccessibility of the deepwater resource due to return flow dilution effects (~0.80/~0.95: ~0.84). The total differential expressed as an improvement factor, $[(0.71)(<0.84)(0.73)(0.94)(~<0.84)]^{-1}$, is: ~>×2.9. Such a large approximately factor-of-three improvement from utilization of new technologies raises possibilities for diversifying use of Lake Kivu's methane reserve for purposes additional to power generation. There are many potentially attractive uses. Typically, however, most will require methane free of high levels of contaminating $CO_2$, for example for use in heating or lighting or as an engine fuel for transport vehicles. Therefore, a barrier to developing diversified gas use is the degree to which Lake Kivu deepwater biogas is heavily contaminated with $CO_2$.

Rwanda's 50% share (~25 MT $CH_4$) of Lake Kivu's gas reserve is equivalent to 1,250 million GJ of thermal energy (LHV). While expectations are that the reserve will be fully dedicated to electricity production, improved efficiencies in power production can, if desired, allow a modest fraction of $CH_4$, say roughly up to 20%, to be directed for other uses. For scale consideration, Rwanda's share of the Lake Kivu gas reserve is equivalent to about 16 years of the present estimated national rate of wood burning noted above. Twenty percent of Rwanda's share of the Lake Kivu gas reserve would be 250 million GJ of thermal energy. That is equivalent to 25 years of replacement of LNG on a scale 20× Rwanda's present level of LPG importation (that being ~$10^4$ tonnes/yr). This level of methane use (0.2 MTA) provides an interesting target for consideration. Methane utilization for non-power purposes can replaced if new production modes are developed for biogas and Solar Natural Gas (SNG) production. Both modes are possible on large scales in modes of integration with Lake Kivu operations.

Home use cooking gas in East Africa typically is provided by imported LPG (propane) stored at low pressure for home use in handy refillable tanks. Cost, however, prohibits widespread uptake. Replacement of LPG by lower-cost methane natural gas has been hindered by the need for high pressure tanks and requirements for high-pressure compressors at refilling stations. The necessary tanks are both expensive and inconveniently heavy. These constraints have hindered uptake of "Compressed Natural Gas" (CNG) for home cooking.

In the US, CNG has become a well-developed, long-demonstrated, cost-effective technology for commercial trucking. CNG vehicle fueling works best for transport of commercial cargoes along routes with a sufficient density of CNG refilling stations (cf., www.ngvamerica.com), but has otherwise not spread widely. Rapidly advancing absorbent technologies for methane storage, however, should offer an escape from such limitations. The technology is known as "Adsorbed Natural Gas" (ANG). (See: www.angpinc.com; www.ingevity.com; https://cenergysolutions.com). It has been demonstrated in several countries for use in NGVs, but impediments remain such as capacity loss from increasing adsorption of impurities with cycling. ANG technology will spread rapidly for both home and vehicle fuel use once improved technologies create new storage efficiencies and cost effectiveness for convenient multi-cycle tank refilling.

Well-established technologies already allow transport and distribution of cryogenic "Liquefied Natural Gas" (LNG) on industrial scales. LNG supplies in cities can be applied to supply NG for home use in cities via residential pipe delivery networks and/or by supplying CNG/ANG dispensaries. LNG also can supply fuel for heating, cooling and fuel for power generation to off-grid operations such as mines, factories, oilfield operations, large project constructions sites, refugee camps, military bases and health crisis emergency centers. LNG additionally can supply truck transportation fuels as well as LNG and/or CNG dispensaries such as might be placed along major transportation routes, for example, linking a Lake Kivu supply hub with airports, major cities and coastal ports. LNG depots also can contribute to strategic energy storage to cover for powerplant shutdown servicing emergencies. They also can contribute to energy independence security in circumstances of international political restriction of cross-border fuel supply.

Through history, developing nations have transitioned from wood-dominated energy economies to fossil fuel economies. Coal typically has provided the first transition fuel. Today, however, methane has become the most attractive and widespread fuel used in homes in higher income countries. Leapfrogging directly from wood to a combination of electricity and natural gas is an obviously desirable step for East Africa (Okereke and Tyldesley, 2011). For the Lake Kivu region, especially the lake's dissolved gas is attractive.

Low-cost solar power in East Africa eventually should offer an opportunity to provide both home and transportation energy sources on cost bases competitive with traditional fuels. The expected future transition requires cost-efficient power transmission and power storage along with conversion technologies from solar power to hydrogen and solar power to hydrogen-carrier "solar fuels" such as synthetic NG (SNG) and Power-to-liquids (PtL) drop-in fuels such as electro-methanol ($CH_3OH$). SNG offers an opportunity to expand extend Rwanda and the region's limited natural gas supply while co-utilizing its $CO_2$ as the carbon carrier for hydrogen energy.

Power storage is a vital need for efficient electricity grid management, especially in situations involving inputs from cyclical and irregular renewable power sources: solar and wind. Lake Kivu power operations utilizing deepwater methane generally are designed for continuous output of power at a constant level with optimal efficiency. Most electricity grids, including Rwandan grids, however, have time-varying demand And increasing levels of inputs of solar power increase the challenge of matching power supply to demand Power storage capacities therefore are needed to provide a useful service especially for a dominant power production hub, as Lake Kivu very clearly has the potential to become for Rwanda. Power storage also is vital to cover gaps in power production necessitated by periodic servicing needs, or from unexpected interruptions. Extensive flexible power storage capabilities integrated into Lake Kivu operations are prudent, valuable and necessary if a Lake Kivu hub is to provide reliable power provision into a national grid at high fractional levels of total demand Power storage capacities, however, have not been implemented on Lake Kivu. Therefore, a pressing challenge exists: how to develop large-scale grid-balancing power storage capacities as a part of Lake Kivu operations. LNG insulated storage is a very significant method for power storage. It can be an efficient fuel depot form of power storage in very large quantities for periods of months or even years.

Pumped hydro storage is an obvious well-developed technology that seems appropriate for highland terrains bordering the lake, but would require huge civil engineering efforts to implement with appropriate safety in a tectonically active earthquake sector. Novel inventive art integrated with power operations and filling the need for large-scale power storage could solve a critically important problem for the development of Lake Kivu as an energy and greentech innovation hub. A capacity to provide large-scale grid-balancing power storage services could have very far-reaching consequences. It could provide a basis for investment to accomplish very large-scale expansion of low-cost grid-accessible solar power across East Africa. Several world class radiation-optimal non-agricultural dryland zones exist is this area. The logic for development of low-cost, grid-integrated, solar power in the region is powerful, straightforward and attractive.

Cryogenic power storage methods such as Liquid Air Energy Storage (LAES) offer high levels of efficiency (>60%) from the ability to recycle cold energy by heat exchange. Cryogenic power storage methods using gases are efficiently integrable into air separation operations obtaining stored liquid oxygen (LO2) as a source for providing a compressed $O_2$ stream into oxyfueling. LO2 production also creates large potential stores of liquid nitrogen (LN2) as a coproduct. LNG offers power storage both in cryogenic and fuel storage modes. The boiling points of both LO2 and LN2 are at lower temperatures than the boiling point of methane. Therefore, large-scale cryogenic operations (e.g., ASU operations for oxyfueling) producing both LO2 and LN2 variously additionally can produce LNG from a methane flow by heat exchange.

Larry Baxter and colleagues have disclosed elegant methods for $CO_2$ scrubbing from gas flows as an integrated aspect of cryogenic cooling to produce LNG and energy storage: U.S. Pat. No. 9,410,736. See also: U.S. Pat. Nos. 8,764,885 and 9,250,012). More generally, cryogenic processes for cleaning natural gas with substantial associated $CO_2$ have long been commercialized (e.g., Exxon: Controlled Freeze Zone, "CFZ," processes: see U.S. Pat. No. 8,312,738 and prior related patents cited therein), and some are integrated into the production of LNG (e.g., www.cryopur.com). For a full review, see: Maqsood et al., (2014). An example of a disclosure of a method utilizing $CO_2$ and LNG together in cryogenic power storage associated with powerplant operations is: Kooy and colleagues: U.S. Pat. No. 4,995,234.

Biehl in EP2528192B1 discloses an energy network system comprised of devices, systems and methods integrating one or more anthropogenic biogas facilities into a biogas network connecting in integration into a pipeline natural gas network and also into an electrical power production and supply network. Biehl's invention furthermore is integrated with power storage capacities utilizing $CH_4$ including optional LNG (and $H_2$ and/or SNG) production and storage methods, systems and facilities/devices, providing thereby a means of grid-balancing. (Grid-balancing capacities are necessary for efficient inclusion of temporally irregular renewable power inputs into grid networks linking power suppliers together with power users.) Biehl's disclosure teaches wonderfully illuminating methods, systems and devices that variously solve problems that in some aspects are similar to those addressed in the present disclosure. EP2528192B1, however, does not teach how to extract and utilize $CO_2$-contaminated gas for electric power production in conjunction with oxyfuel turbine combustion where use of $CO_2$-contaminated gas also is integrated with co-production of NG. Many steps in EP2528192B1 are unrelated to these means of utilizing gas that is substantially more $CO_2$-contaminated than is biogas produced in land-based waste systems.

Power-to-gas (P-t-G, G=Synthetic Natural Gas, SNG) methods provide a means whereby a constant output source of electric power generation can be time-modulated in a greentech hub complex by directing power into liquid fuels production at times when grid demand is low. P-t-G also allows inputs of irregular power from renewable sources to be integrated into grid-balancing power production and storage operations. In P-t-G methods, electric power initially is used to produce $H_2$ via water electrolysis, (co-producing a stream of $O_2$ co-product). Following electrolytic $H_2$ production, P-t-G utilizes heat and pressure to support catalyzed reactions for methane production, and/or it may utilize biological methanation processes. Both P-t-G methods use inputs of $H_2$ and $CO_2$. Non-biological SNG production typically proceeds by the $CO_2$-utilizing Sabatier reaction: $CO_2+4H_2$ yields $CH_4+2H_2O$. Many additional methods of "artificial photosynthesis" are in active development for production of SNG as well as liquid fuels such as methanol and other so-called "solar fuels" and "solar chemicals." (Many references are cited in: US 2017/0341942 A1. See also: Ausfelder et al., 2017.)

Power-to-liquids (P-t-L) is another means whereby a constant output source of electric power generation can be time-modulated by directing power into liquid fuels production at times when grid demand is low, and/or for grid-balancing integration of irregular renewable power inputs. Synthetic methanol is of particular interest as a storable fuel providing power storage capacities. Methanol can be produced from inputs of $H_2$ and $CO_2$ with very high energy input efficiency of about 88% (LHV) by the overall catalyzed reaction: $CO_2+3H_2$ yields $CH_4O+H_2O$ (Cf., Ausfelder et al., 2017, and references therein). Methanol can be mixed into petrol/gasoline fuel as a drop-in supplement. It also provides an excellent stove fuel for safe smoke-free home use. It can be used in methanol-specific lanterns. I disclosed a method for production of "green methanol" as an output for CCU (Carbon Capture Utilization) operations in US 2017/0341942 A1. The potential for methanol production at Lake Kivu involves capacities for $CO_2$ utilization as well as power storage grid-balancing for large-scale solar power inputs. P-t-L methanol production can become an economic process at Lake Kivu with expected future improvements in large-scale hydrolysis equipment producing separated streams of $H_2$ and $O_2$ from water. The economics become attractive once the hub-gathered solar power cost-of-production (COP) reaches ~$0.02/kWh. HVDC-transportable photovoltaic power at or below a 3 cent COP price point could be exportable from a Lake Kivu power storage hub. Large-scale solar power could be produced by large-scale solar PV farms located in radiation-optimal non-agricultural dryland areas in northeastern Uganda, northern Kenya and western Tanzania. Synthetic methanol and other liquid fuels also can be produced by Fischer-Tropsch and related catalyzed processes utilizing inputs of natural gas as a hydrogen source, plus water, $CO_2$, and heat with the application of pressure.

The Union Chimique Belge (UCB) designed, constructed and operated a small gas extraction and processing plant on the Rwanda side of Lake Kivu located on the Cap Rubona peninsula south of Gisenyi during the period 1954-1971 (Tietze, 2000; Halbwachs website). This venture was the focus of a 1957-1958 film, "Le Gaz Methane du Lac Kivu" (Capart et al., 1958). As noted above, the method of degassing and gas purification was disclosed in 1954 in (Belgian patent) BE 531780: "PROCEDE D'EXPOITATION DE GAZ DISSOUS DANS DES EAUX PROFONDES." One purpose of the plant was to provide heating gas to supply the nearby "Bralirwa" brewery. Operations began in 1959. (Though no longer in use, the original methane storage tanks remain visible in front of the brewery. Photo: www.photo-volcanica.com/VolcanoInfo/Nyiragongo/IMG_9492.JPG)

The challenge was to obtain methane with associated $CO_2$ reduced to a degree allowing efficient combustion with oxygen provision by air. A 3-stage process was disclosed providing a means to accomplish this goal. The first stage was bubble extraction at a depth of ~16 meters. The bubble extractor operated on an auto-siphoning upflow near to the top of a pipeline laid along the lakebottom and drawing methane-rich deepwater from a depth of 350 meters. The pipe proceeded upslope underwater to the shoreline location of the gas processing plant. Bubble extraction at ~16 meters yielded a stage-1 gas composition: $CO_2/CH_4$=51%/46% (by volume): 1.1. This partly-purified composition was obtained from deepwater with an ~3:1 dissolved gas composition: $CO_2/CH_4$=74%/24%. A second stage was based on $CO_2$-scrubbing/washing using $CO_2$-understaturated water obtained from the near surface of Lake Kivu. In this stage, the stage-1 gas flow was scrubbed by means of bubble flow upwards within a vertical bubble column open at the bottom at a depth of 6.5 meters within the lake. This device drew an upward flow of $CO_2$-understaturated water up the tube along with the bubble flux in the manner well-known to keepers of home aquariums. A stage-2 purified gas emerged at the top of the column above the surface of the lake along with a flow of scrubbing water. The flows were separated into gas and water streams input through a third stage washing device. The third stage device was comprised of a percolative degassing tower or column with vertical extension roughly 2× its horizontal width. In this device, gas proceeding from the second-stage was directed to flow from a bottom entry port upwards through packing materials. The flow of washing water from second stage was directed to percolate downwards from an entry port at the top, flowing along the wetted surfaces of the packing materials. Gas emerging from this 3-stage process was documented to have a substantially purified composition: $CO_2/CH_4$=7.5%/87% (0.086), with overall methane losses (claimed to be) limited to ~4%. Additional details are recorded in Bikumu, (2005) and in a painted diagram displayed on the site of the defunct extraction plant on Cap Rubona, a photo of which appears on the website of Halbwachs (http://mhalb.pagesperso-orange.fr/kivu/eg/eg 2crubona.htm). The technology was innovative, simple, elegant and effective. It did not, however, address particular challenges pertinent to large-scale exploitation of the deepwater resource such as management of return flow water and related matters impacting both long-term lake safety and long-term preservation of extractability of the deepwater gas reserve in advanced stages of extraction. It also neglected capture and utilization of the $CO_2$ and other dissolved resources present in the deepwater. Degassed $CO_2$ was vented to the atmosphere. For present purposes, we note that the design for $CH_4$ production from Lake Kivu disclosed in BE 531780 is not a method that produces electric power. It is not a method that does so, co-capturing both degassed and combustion-generated $CO_2$. And it is not a method of power and $CO_2$-purified gas co-production.

A significant aspect of the method disclosed in BE 531780 is that it is scale-limited by its use of a second stage bubble column situated within open water. An open water bubble column is a geometrically non-scalable technology for expansion to larger scales of waterflow and gas extraction. This fact is reflected in subsequent designs implemented on Lake Kivu for larger-scale operations utilizing the basic insights of BE 531780, but not its specific design. One problem of all subsequent scale-ups of this type has been much higher methane "slip" losses compared to the 4% documented in BE 531780. Also, as noted, the method of BE 531780 degasses and vents most of the $CO_2$ carried up in deepwater into the atmosphere. The newer methods implemented on Lake Kivu return most of the $CO_2$ back into the lake, with the predominant fraction of $CO_2$ (roughly 80%) being returned to a great depth. None of the disclosed and practiced methods capture the $CO_2$ brought up in the deepwater. None capture the $CO_2$ created in gas combustion to produce heat and/or power.

A generalization of the staged process disclosed in BE 531780 is described by Michel Halbwachs (on his website) and by Klaus Tietze (in two extensive reports: 2000, 2007).

The Belgian UCB water-staged process has been modified in various ways for gas production projects subsequent to the UCB project which ended in 1971. These include the "KP-1," pilot platform and electric power utility station operated on Cap Rubona, owned and operated by the Government of Rwanda, known as UPEZGAZ (Unite pour la Promotion et l'Exploitation du Gaz du Lac Kivu, and also as the Kibuye Power Company (Pasche et al. 2010).

The Cap Rubona location also was used by a venture that successfully tested pilot equipment designed and implemented by M. Halbwachs and colleagues in ~2008 and 2009 (Halbwachs 2014). The technology design of this project is detailed on M. Halbwachs' website. It follows the water-staged $CO_2$ removal design principles pioneered by UCB.

The general design of the "KivuWatt" project follows the UCB-initiated water-staged technology for $CO_2$ extraction with the main aspects of design focused on removing $CO_2$ from methane. (KivuWatt's technology design is shown on Antares Offshore LLC website. Further information has been published by Osterdijk and Hoencamp 2012; and Rosen, 2015, and is present on the Contour Global website.) KivuWatt presently produces 26 MW on Lake Kivu.

Power plant systems burning methane to produce power typically have purity constraints on the contaminating carbon dioxide in the gas supplied into combustion. These typically have required carbon dioxide levels very much lower than in the bulk dissolved gas in the deep lake of the special type described herein ($CO_2/CH_4$~3 to 5, molar ratio). A typical upper limit is $CO_2$ lower than 40% (mole fraction), that is: $CO_2/CH_4$<0.67.

Extraction methods for Lake Kivu deepwater depend upon processes that begin to degas methane at depth. Deepwater autosiphons upwards in riser pipes into and through one or more gas-water separation chambers. Being far less soluble in water than $CO_2$, methane in Lake Kivu deepwater contributes to initiation of gas saturation at a depth well below that where $CO_2$ alone would come into saturation. Because the solubility difference is so great, this is the case even for water with dissolved $CO_2/CH_4$~5. Therefore, differential exsolution under hydrostatic pressure at depth favors depth-dependent differential $CH_4$ degassing relative to $CO_2$ degassing, though exsolution is always of a mixed composition gas rather than initially pure $CH_4$. Gas exsolved obtained at depth will have $CO_2/CH_4$ ratios less that the bulk dissolved composition (as documented in the next section). Depths in the range of 20 meters have sometimes been used in Lake Kivu for first stage gas separation. (If methane were not present, $CO_2$ would begin to exsolve at roughly this depth.) The gas saturation line for both gases together, however, occurs at a much deeper level: roughly 150 meters depth for up-flowing deepwater obtained from the Main Resource Zone (MRZ).

Experimental results (see FIGS. 9A-9D) were published by Tietze and Meier-Reimer, (1977) providing specific measures for $CO_2/CH_4$ and degassing volumes for stepwise degassing of Lake Kivu deepwater proceeding in an upward depressurizing flow. (The data also exists in Tietze, 1978, 2000, 2007.) Results were obtained from deepwater sourced at two different depths: 320 m and 450 m. Deepwater sourced from the shallower depth of 320 m contained dissolved gas with ~28% $CH_4$ and ~72% $CO_2$ (volumetric mole fractions). Deepwater sourced from the deeper depth of 450 m contained dissolved gas with substantially more $CO_2$ than was present in 320 m deepwater and with a slightly lesser concentration of methane. The 450 m deepwater contained gas with ~22% $CH_4$ and ~78% $CO_2$. Gas exsolved from 450 m deepwater in a first step obtained at ~80 m had a composition: ~54% $CH_4$ and ~45% $CO_2$, ($CO_2/CH_4$=0.83. Exsolved gas was ~11% of total (dissolved+exsolved) gas and contained ~28% of the total of $CH_4$. By comparison, gas exsolved at ~80 meters depth from the deepwater source at 320 m had a composition: ~70% $CH_4$ and ~28% $CO_2$, ($CO_2/CH_4$=0.40). Exsolved gas was ~14% of total gas and contained ~35% of total (dissolved+exsolved) $CH_4$. Published plots of results for the entire range of experiments confirmed, as expected, that lesser fractions of the total available $CH_4$ are degassed at deeper depths down to the depth of first exsolution (at ~140 meters for the 320 m-sourced deepwater, and at ~155 meters for the 450-m-sourced deepwater). The results indicate only modest increases in the relative abundances of $CH_4$ relative to $CO_2$ in degassed gas with increasing depth moving below 80 meters. A general summary of the published results is that in both cases of deepwater sources, at 320 meters and at 450 meters, methane degases at depths in the water column above (less than) ~130 meters across a spectrum of compositions and fractions of methane degassed, and, above ~80 meters, with substantial (>25%) fractions of the total available methane extracted at depth in compositions with $CO_2/CH_4$ at or below ~1 (mole ratio).

Bubble trapping devices acting as gas/liquid separators are common. They are utilized in all disclosures and practiced technologies for extraction and processing of gas dissolved in Lake Kivu deepwater. For example, BE 531780 discloses a gas/liquid separator operating at a depth of 16 meters as a means of separating captured gas from non-captured gas (the latter being mostly $CO_2$ that, as it degasses, drives an auto-siphoning pump for the upflow of extracted deepwater and then is vented into the atmosphere). I disclosed bubble trapping gas/liquid separators of different types in U.S. Pat. No. 9,732,671. This method of bubble separation (optionally operating as a multiplicity in a depth series) provides a means to increase the separation yield of $CH_4$ degassed from its source fully dissolved in water. U.S. Pat. No. 9,732,671 teaches extracting a gas flow (or flows) at depth that is merged into a single end product integrated gas flow (provided into oxyfuel combustion) that does not separate $CO_2$ from $CH_4$.

Accordingly, it is desired to provide a novel method to extract and utilize the trapped deepwater gases of Lake Kivu, (or from natural gas from wells with similarly high levels of associated $CO_2$), in an efficient integrated manner that allows efficient multi-production of power and gas (and also a nearly pure $CO_2$ stream) by splitting the gas into two separated streams directed into differing utilizations: (i) a major fraction stream of high-$CO_2$ contaminated gas combusted in an efficient process of electric power generation that is able to intake such a gas type (and that optionally provides a nearly pure $CO_2$ stream, post-combustion), and (ii) a sidestream (carrying from roughly ½ down to lesser fractions of the flux of $CH_4$) of partially scrubbed gas possessing a relatively low $CO_2/CH_4$ (such as may be utilized as input for efficient production of purified $CH_4$ for a variety of uses). It is further desired to provide novel methods and/or systems additionally incorporating cryogenic sub-methods and/or sub-systems for LNG production, and/or for efficient cryogenic $CO_2$ scrubbing for gas purification, and/or for integration of power storage capacities integrated with electric power generation capacities, and importantly optionally including grid-balancing capacities required to facilitate acceptance and incorporation of inputs of renewable power from irregular sources such as solar and wind. It is still further desired to provide a process including path splitting between its endpoint modes of production so as to enable the co-production of a flux of gas in a condition suitable for gas production alongside oxyfuel power production.

All references cited herein are incorporated herein by reference in their entireties.

BRIEF SUMMARY OF THE INVENTION

A first aspect of the invention comprises a gas separation and utilization method comprising:
providing an ascending flow of a liquid containing carbon dioxide gas and methane gas;
extracting at least a fraction of the methane gas from the liquid to provide a methane enriched gas;
extracting at least a fraction of the carbon dioxide gas from the liquid to provide a carbon dioxide enriched gas, which is extracted from the ascending flow of the liquid downstream of the methane enriched gas;
collecting the methane enriched gas;
feeding the carbon dioxide enriched gas as a fuel into an oxyfuel power generation system;
generating power from the oxyfuel power generation system; and
expelling an exhaust from the oxyfuel power generation system, wherein the exhaust comprises carbon dioxide and water vapor.

In certain embodiments, the methane gas extracting step comprises conveying the liquid through a bubble trapping device to collect gas bubbles comprising the methane enriched gas.

In certain embodiments, the liquid is water extracted from a body of water and contains carbon dioxide gas and methane gas at a molar $CO_2/CH_4$ ratio greater than 2. In certain of these embodiments, the body of water is Lake Kivu.

In certain embodiments, the liquid comprises water in a closed loop circulation device to which a gaseous mixture containing methane and carbon dioxide is added and wherein at least the carbon dioxide mostly is dissolved.

In certain embodiments, the methane enriched gas has a $CO_2/CH_4$ molar ratio less than or equal to 1.

In certain embodiments, the method further comprises at least one further extraction step wherein solid carbon dioxide is extracted from the methane enriched gas at a refrigeration temperature sufficiently low to form solid carbon dioxide.

In certain embodiments, the at least one further extraction step comprises:
bubbling the methane enriched gas upwards in liquefied natural gas (LNG);
extracting the solid carbon dioxide from the LNG; and
collecting LNG generated as an increase in LNG volume generated by LNG condensed from the methane enriched gas.

In certain embodiments, the at least one further extraction step comprises:
bubbling the methane enriched gas upwards in a first stage liquid at a first stage temperature at which methane remains in a gaseous phase and carbon dioxide desublimates to provide solid carbon dioxide and a carbon dioxide depleted gas;
bubbling the carbon dioxide depleted gas upwards in LNG; and
collecting LNG generated as an increase in LNG volume generated by LNG condensed from the methane enriched gas.

In certain embodiments, the method further comprises selectively storing LNG collected, exporting LNG collected, combusting LNG collected, combusting previously stored LNG and/or combusting purified methane gas so as to provide variable power output.

In certain embodiments, the method further comprises splitting the methane enriched gas into at least two different process streams comprising: (a) a first process stream comprising power-generating combustion of methane; and (b) a second process stream comprising production of a purified methane product, and at least one of storage and distribution of the purified methane product.

In certain embodiments, the method is conducted in a system in electrical communication with an external power grid and the system is controlled to direct power into fuel production and storage when demand from the external power grid is below a minimum demand level or when an irregular renewable power input is at or above a minimum input level, and to direct power to the external power grid when demand from the external power grid is at or above the minimum demand level or when the irregular renewable power input is below the minimum input level. In certain of these embodiments, the method further comprises transforming electric power from the external power grid into a fuel selected from the group consisting of methane, methanol, hydrogen and formic acid.

In certain embodiments, the method is conducted in a system in electrical communication with an external power grid, wherein: (a) the system includes at least one integrated cryogenic facility configured to: i) cryogenically separate air to obtain liquid oxygen and liquid nitrogen; ii) cryogenically separate carbon dioxide from a gas containing methane and carbon dioxide to obtain purified methane and purified carbon dioxide; iii) optionally cryogenically transform purified methane into liquefied natural gas; iv) optionally produce power utilizing cold energy stored in cryogenically liquefied gases by processes of heat exchange and by use of gas flow turbine power generators; v) modulate between power intake for cryogenic processing and power production utilizing stored cold energy, said modulation enabling storing power from, and providing power output to, the external power grid according to need.

A second aspect of the invention comprises a system configured to perform the inventive method, said system comprising:
(a) a water degassing system comprising:
(i) a conduit configured to provide the ascending flow of the liquid containing carbon dioxide gas and methane gas;
(ii) a bubble trapping device arranged in the conduit so as to collect from the liquid gas bubbles comprising the methane enriched gas and convey a resulting methane enriched gas stream into a sidestream conduit; and (iii) a degasser arranged in the conduit downstream of the bubble trapping device to collect the carbon dioxide enriched gas; and (b) an oxyfuel power generation system in direct or indirect communication with the degasser, wherein the oxyfuel power generation system is configured to generate power from the carbon dioxide enriched gas from the degasser.

In certain embodiments, the system further comprises:

(c) a vessel in fluid communication with the sidestream conduit and containing liquefied natural gas (LNG), wherein the vessel is configured to bubble the methane enriched gas upwards in the LNG to provide solid carbon dioxide particles and to collect LNG condensed from the methane enriched gas; and (d) means for selectively storing LNG collected, combusting LNG collected, combusting previously stored LNG and/or combusting purified methane gas so as to provide variable power output.

In certain embodiments, the system further comprises:

(c) a first vessel in fluid communication with the sidestream conduit and containing a first stage liquid at a first stage temperature at which methane remains in a gaseous phase and carbon dioxide desublimates to provide solid carbon dioxide and a carbon dioxide depleted gas, wherein the first vessel is configured to bubble the methane enriched gas upwards in the first stage liquid to provide solid carbon dioxide particles and to provide a carbon dioxide depleted gas;

(d) a second vessel containing liquefied natural gas (LNG), wherein the second vessel is configured to bubble the carbon dioxide depleted gas from the first vessel upwards in the LNG and to collect LNG condensed from the carbon dioxide depleted gas; and (e) means for selectively storing LNG collected, combusting LNG collected, combusting previously stored LNG and/or combusting methane gas of the carbon dioxide depleted gas of step (c) so as to provide variable power output.

In certain embodiments of the system, the second vessel is further configured to desublimate any carbon dioxide gas remaining in the carbon dioxide depleted gas to provide solid carbon dioxide.

In certain embodiments, the system further comprises a controller in electrical communication with an external power grid and configured to control the system to direct power into fuel production and storage when demand from the external power grid is low or when irregular renewable power input is high, and to direct power to the external power grid when demand from the external power grid is high or when irregular renewable power input is low.

In certain embodiments, the system is configured to selectively transform electric power from the external power grid into a fuel selected from the group consisting of methane, methanol, hydrogen and formic acid.

In certain embodiments, the system further comprises an integrated cryogenic facility configured to: i) cryogenically separate air to obtain liquid oxygen and liquid nitrogen; ii) cryogenically separate carbon dioxide from a gas containing methane and carbon dioxide to obtain purified methane and purified carbon dioxide; iii) optionally cryogenically transform purified methane into liquefied natural gas; iv) optionally produce power utilizing cold energy stored in cryogenically liquefied gases by processes of heat exchange and by use of gas flow turbine power generators; v) modulate between power intake for cryogenic processing and power production utilizing stored cold energy, said modulation enabling storing power from, and providing power output to, the external power grid according to need.

A third aspect of the invention comprises a grid balancing method comprising:

incorporating the system of the invention into a grid;

controlling the system to direct power into fuel production and storage when grid demand is low or when irregular renewable power input is high, and to direct power to the grid when grid demand is high or when irregular renewable power input is low.

In certain embodiments of the grid balancing method, electric power from the grid is transformed into a fuel selected from the group consisting of methane, methanol, hydrogen and formic acid.

BRIEF DESCRIPTION OF SEVERAL VIEWS OF THE DRAWINGS

The invention will be described in conjunction with the following drawings in which like reference numerals designate like elements and wherein:

FIG. 2 is a schematic view in a vertical plane showing an embodiment of the invention within a Lake Kivu gas and power production operation. The box indicates another core inventive aspect of the invention in some extended embodiments: integration with the sub-method and/or sub-system illustrated in FIG. 1 of cryogenic gas storage as a means of cryogenic power storage, including LNG additionally providing power storage by fuel stockpiling.

FIGS. 9A and 9C are graphs of gas-water ratio against excess pressure above atmospheric pressure. FIGS. 9B and 9D are graphs of percentage volume against excess pressure above atmospheric pressure.

DETAILED DESCRIPTION OF PREFERRED EMBODIMENTS OF THE INVENTION

Figure 1:
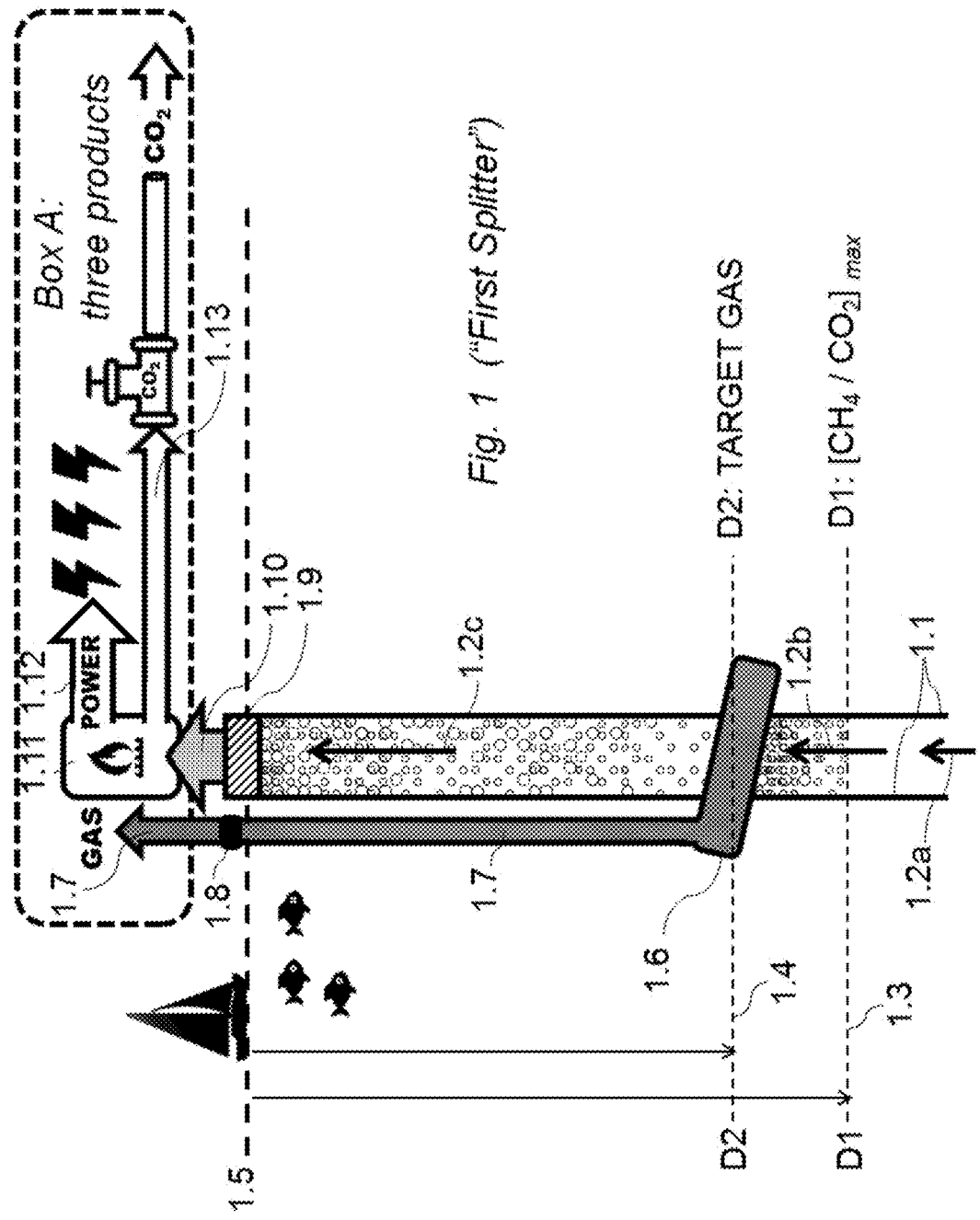
FIG. 1 is a schematic view in a vertical plane showing an embodiment of one of the core inventive aspects of the invention herein called the "first splitter."

Previously I disclosed methods for hyper-efficient power generation providing unseparated high-$CO_2$ gas into oxyfuel combustion for optimal extraction-utilization of Lake Kivu's deepwater gas ($CO_2/CH_4$ ~4, moles). New process splitting methods produce hyper-efficient power plus "sidestream" gas production via mid-depth bubble trapping. The invention's integration offers multiple greentech advances for offshore high-$CO_2$ gas and Kivu: (i) hyper-efficient Zero-Emission PowerPlant (ZEPP-type) power; (ii) gas co-production (NG and/or LNG); (iii) hyper-efficient $CO_2$ capture for utilization; and (iv) integrated cryo-power storage allowing grid-balancing integrations of renewable power and/or "solar fuels" co-production. High $CO_2/CH_4$ aids efficiency for Allam's supercritical-$CO_2$ power cycle oxyfuel turbine. Process splitting for sidestream gas production allows gas/power co-production with selective control over powerplant power output (generate power v. store/sell gas). Attractive LNG production possibilities include short- and long-term reserve power storage and efficient cryogenic integration synergies for air and gas refrigeration-separation-cleaning (L-$O_2$/$N_2$/$CO_2$/Ar/NG & dry ice), along with "cold energy" power storage.

Definitions

The term "fluid" as used herein refers to a gas or preferably a liquid. Fluids suitable for use in the invention include but are not limited to water, aqueous solutions of alkali metal carbonate/bi-carbonate salts, seawater, amine solvents (such as MEA), ionic liquids (of which many exist, cf., Venkatraman et al., 2019), and KS-1 solvent. While water is used for most process descriptions provided herein, and applies to Lake Kivu discussions, this does not limit the scope of the invention, which encompasses the use of fluids other than or additional to water. In general, the invention may be practiced with fluids possessing physical properties providing a means for dissolution of $CO_2$ (and sometimes a means for dissolution, total or partial, of methane also) and also providing a means for degassing of dissolved $CO_2$ (and sometimes providing a means for partial degassing of methane also), both activities varying according to variations in pressure whereby a gas flux separation ("splitting") is obtained in both fraction and composition of methane split-off into a so-called "sidestream" process path, leaving behind a residual and more $CO_2$-rich so-called "mainstream" process path.

As used herein, the expression "minimum demand level" is any selected amount of power required by the external power grid. The value of the minimum demand level can be set at any desired amount by the system, system operator, etc.

As used herein, the expression "minimum input level" is any selected amount of irregular renewable power input specified by the system, system operator, etc.

A simple mode of the invention integrates a sub-method of "splitting" an extractive gas flow into two (or possibly more) different flux and process streams and associated utilizations: (a) one being power-generating combustion of high-$CO_2$ methane; and (b) the other being production of purified methane in various forms, including LNG if/as desired.

The invention proceeds in its initial aspect by means of a physio-chemical means of splitting an input methane-containing flux with associated $CO_2$ present into (at least) two methane-containing gas flows possessing different compositions of associated $CO_2$ (in terms of $CO_2/CH_4$ ratios), whereby most of the associated $CO_2$ has been carried along into the split streams of gas flux that have been split and directed into different process paths.

The first process "splitting" begins with a gas flux splitting based on the differential degassing behavior of a mixed composition ($CO_2+CH_4$) water-dissolved gas. Water that the gas is (totally or partially) dissolved within proceeds upwards within a pipe (that in the case of Lake Kivu is positioned within a static water body) or pressurized chamber containing a vertical pressure series according to the vertical dimension of the chamber. The upwardly-flowing water within the pipe (or pipe-like pressure chamber) experiences depressurization and progressive degassing as it flows upwards (such that the pressure-dependent solubilities of the dissolved gases decrease). Degassing within a pipe (or pipe-like structure) in such a context generates a bubbles-driven auto-siphoning flow upwards. Gas that degasses initially under pressure (at depth in Lake Kivu type circumstances) in such a process will be partially cleaned of $CO_2$ without any energy input cost. Bubble-trapping methods of gas-water separation obtain a separated flow of ("sidestream") gas possessing this partially $CO_2$-cleaned property. Downstream (i.e., further along the flowpath and typically upward) flow of remaining ("mainstream") dissolved gas (that is not separated by a bubble-trapping process at depth) will possess a composition enriched in $CO_2$ relative to the dissolved deep source composition. As high-$CO_2$ gas is favorable to oxyfuel combustion, especially in the Allam Cycle, this mainstream fraction of the gas flux remaining after sidestream splitting-off by bubble-trapping may be (is) directed into a total degassing process with the resulting gas directed into high-efficiency oxyfuel combustion. The partially cleaned sidestream fraction of the split gas flux obtained by bubble-trapping may be (is) directed into processes that allow a selectivity towards gas production (and storage and/or sales) as contrasted with oxyfuel power production process that the mainstream of gas is directed into. The sidestream gas flux involves a process selectivity. It may be scrubbed of associated $CO_2$ for gas production for sales or storage (including LNG production if./as desired). It also sometimes may be possible to burn gas of the compositional type of a separated sidestream without any, or without extensive, $CO_2$ scrubbing. This aspect of process selectivity for the sidestream flux creates the basis for what is herein described as a second process "splitting," or "second splitter."

Figure 5:
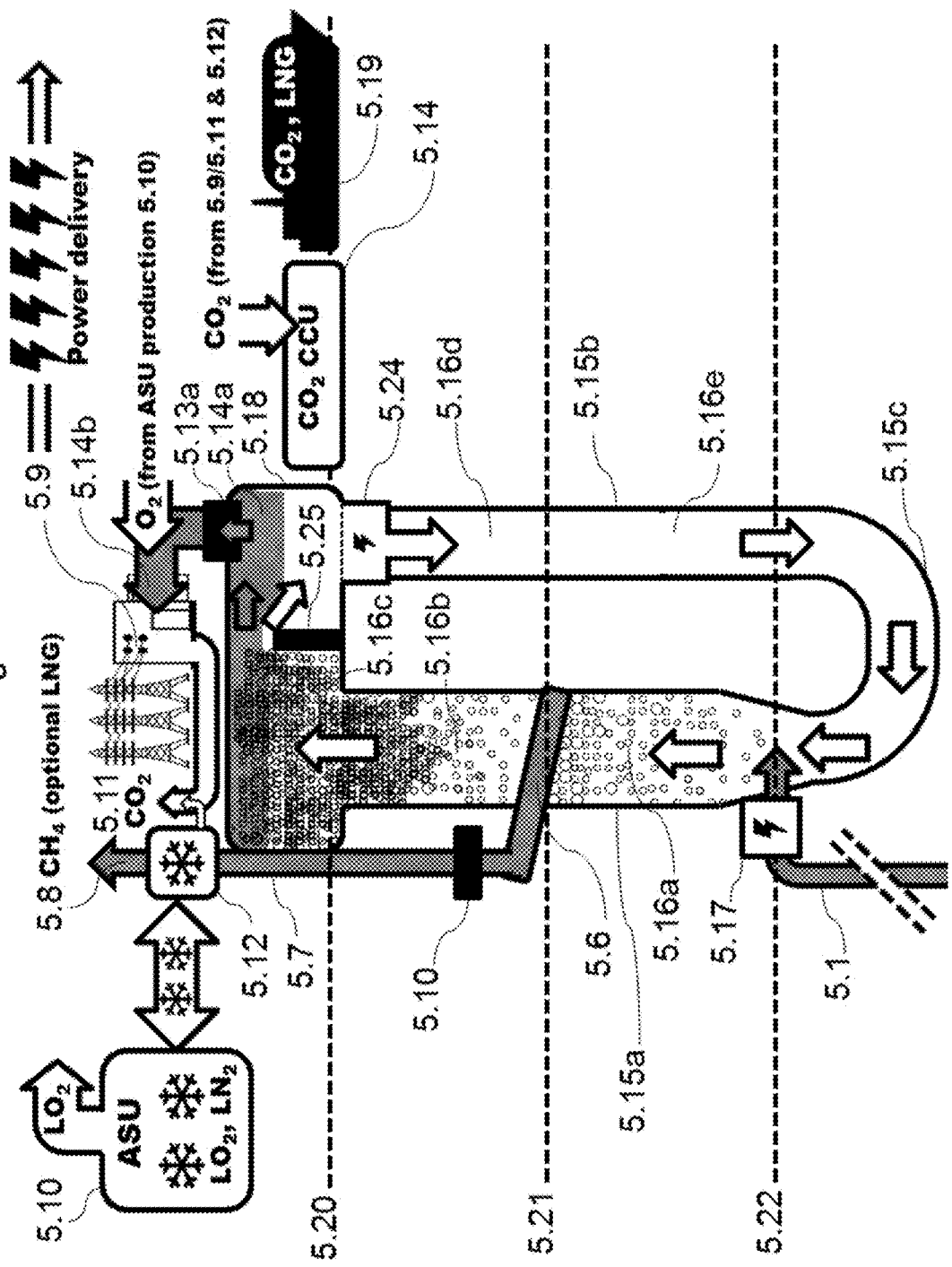
FIG. 5 is a schematic view in a vertical plane showing an embodiment of the invention applied to (as shown: offshore) processing and utilization of well gas.

Practice of the invention on land can differ from Lake Kivu-type practice illustrated in FIG. 1. Practice of the invention also may differ from Lake-Kivu-like practice for offshore oil and gas fields as is as illustrated (for one type of preferred embodiment) in FIG. 5. (FIG. 5 illustrates an operation that is extended in vertical dimension from a selected injection depth upwards to a near surface "total" degassing of the "mainstream" flux of gas. Degassing may be at atmospheric pressure or may be assisted by vacuum pumping away of degassed gas as described in U.S. Pat. No. 9,732,671. Practice of the invention in some different preferred embodiments may utilize artificial modes of pressurization and depressurization of water flowing through a $CO_2$-absorbing, depressurizing (typically by upward-flow), circulating, water column with a degassing and return circulation system. Use of artificial-mechanical pressurization and depressurization sub-methods and sub-systems allow more compact realization of equipment when well-derived gas sources are processed. (See FIG. 10 and the discussion of FIG. 10 in the text below for further description.) Such artificial modes of pressurization and depressurization of water especially facilitate on-land practice of the invention.

A second mode or aspect of the invention adds the additional second splitting function noted above. Doing so creates a power-output modulating power-storing capacity. It integrates the first mode of methane flow and process splitting together with a second mode of methane flow process splitting. The second mode provides a means to control the fraction of extracted methane flow directed into power production versus into gas storage (Stored gas can be a mode of power storage if associated with an on-demand available capacity to generate power from it.) This second mode of splitting provides control over electric power output from an integrated gas extraction, gas processing, gas producing, and electric power producing complex. Main power generating engines in such a complex might function at a constant rate of fuel inflow targeting a power generation efficiency optimum. A capacity for variable power output control for such an integrated complex, however, is highly desirable. Power output variability allows for provision of grid-balancing services, including power storage such as is needed for (direct and/or grid) integration of temporally irregular electric power inputs from renewable power sources. Finally, the invention's first stage sub-method of stream splitting involves separation of $CO_2$ from $CH_4$ in a rare and unusual manner that effectively is energy cost free. As noted above, this method uses the pressure continuum of an extended (deep) natural water column for $CO_2$ separation from methane ($CH_4$) utilizing degassing of dissolved gas auto-siphoning upwards within a pipe, wherewith $CO_2/CH_4$ fractionation-separation occurs according to differing water solubilities of $CH_4$ and $CO_2$ including pressure variabilities. The invention is novel. Directly related art appears to be confined only to Lake Kivu gas extraction-utilization practices and disclosures. It also in non-obvious. The possibility of efficiently utilizing a very-high-$CO_2$ "mainstream" (post-"sidestream"-extraction residual) flux of gas for oxyfuel turbine combustion is not widely understood and appreciated. No existing teachings clarify the significance of this fact for the possibility of split-processing applications of oxyfuel turbine technology to the utilization of high-$CO_2$ gas sources.

First, a series of broad descriptions of preferred embodiments of the invention is provided. These are intended to illuminate the general logics of the inventive art disclosed herein. Second, a brief clarifying description is provided describing the physical basis of the inventive art. Third, a series of more narrow descriptions of preferred embodiments of the invention is provided. These provide figure-by-figure and item-by-item descriptions of the representations of the invention given in the figures in their numbered ordering.

The invention can be comprehended in terms of specific purposes other than its most general aspect providing utility, efficiency and diversification of product outputs assisting efficient production and utilization of high-$CO_2$ gas sources. (Such sources include the deepwater of Lake Kivu in Africa, and many high-$CO_2$ offshore gasfields, for example, particularly the very large East Natuna offshore gasfields of Indonesia.) Specific purposes can be summarized as three. The first, (#1), is to provide a means providing splitting out of a sidestream of gas in an energy-efficient manner, serving various aims as described in the related art section producing methane products, and optimally including LNG production, storage and sales. The second purpose, (#2), is to provide a means providing controllable modulation of electric power output from a (typically optimal) constant flux intake of high-$CO_2$ gas (such a capacity for electric power output modulation creating a way to offer valuable grid management services at Lake Kivu). The third purpose, (#3), is to provide a means providing grid-balancing capacities for power storage, both storage of power produced internally from gasflow intake, and also from acceptance of external inputs of renewable power.

Figure 6:
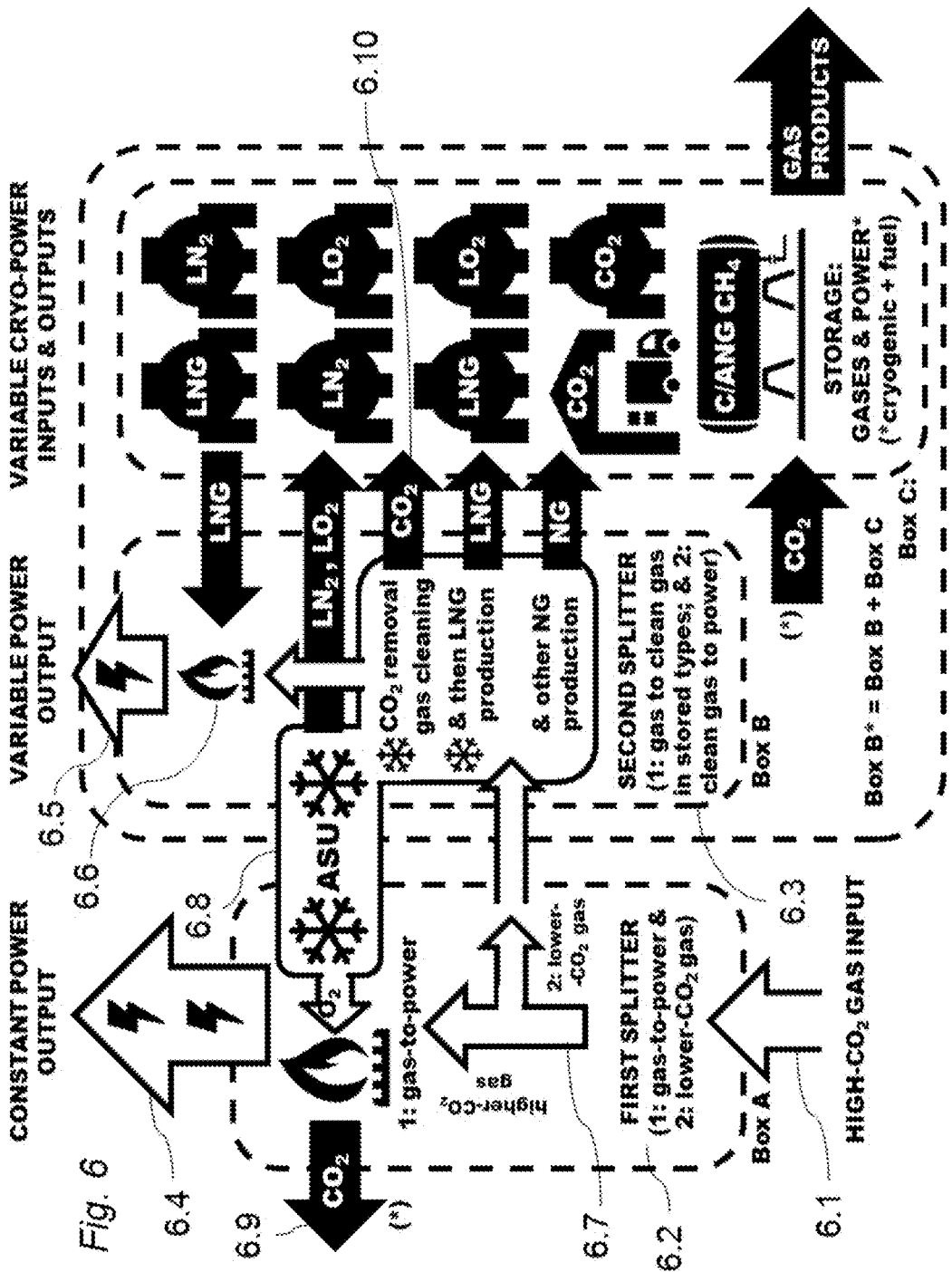
FIG. 6 is a schematic conceptual view showing a preferred embodiment of the invention as an integrative combination of two sub-methods and/or sub-systems (herein known as the "first splitter" and the "second splitter") represented within two dashed boxes, Box A and Box B*.

The invention disclosed herein utilizes high-$CO_2$ natural gas by means of either a single or dual splitting method and/or system. (A splitting method and/or system hereafter sometimes is abbreviated as: "splitter.") FIG. 1 illustrates the first splitter type: a static splitter in the sense that it partitions methane into two fractions, the relative proportions of which are not under short-term control (minutes to hours). The two split gas flux fractions are described as a "mainstream" and a "sidestream." FIG. 1 shows an embodiment of the invention in single splitter mode. A sidestream gas fraction flow is directed leftwards providing an output of gas with relatively high purity ($CO_2$ removal) relative to the source intake composition. The end state output from the mainstream process is comprised of electric power and $CO_2$. The embodiment illustrated in FIG. 1 is shown as an application to the production and utilization of Lake Kivu deepwater. A different type of application to an offshore well gas is illustrated in FIG. 5 (though note that on-land practice is possible as the method is not restricted to practice only within bodies of water). FIG. 6 illustrates a dual splitter embodiment modality of the invention. This type of embodiment integrates together both the first and the second splitter modes of the invention. These operate in coordinated manner in direct integration with one another. The integration provides a means or modality of controllable power output. Power output is modulated by degrees of gas output in the second splitter, which is not static but rather under dynamic control by any methods, systems and devices such as can be selected by persons of average skill in the art of process design and installation in gas treatment and gas power plant facilities. Changes in the partitioning fraction of the input ("lower-CO2 gas") between electric power and gas storage (and/or export) are under short-term control (roughly minutes to hours). Gas flow through the second process splitting is partitioned under control with some fraction flowing into storage (or sales) directly providing fuel for electric power output. A resulting capacity for variable controllable power output supplements a constant power output shown in FIG. 6. Constant (or near constant) power is an aspect of output optimality in the electric power output of the first splitter (for reference see FIG. 1). Again, variability control over power output via a second splitter provides control over directing a selectable fraction of potential power carried in the form of a sidestream of gas (provided by the first splitter) between: (a) immediate power production, and (b) gas storage and/or export.

The term "splitting" here describes a (sub-)method and/or (sub-)system that intakes a single component of a water flux containing gas (which may or may not be fully dissolved within a fluid flow) and then splits the flux of gas into two different processing trajectories with different $CO_2/CH_4$ compositions. The first splitting transforms a gas flux into two different process outputs. One output is a fractional compositionally modified gas flux (known as the "sidestream"). The other is electric power generated by liberation of the chemical energy stored in the $CH_4$ in the residual "mainstream" gas flux. In the case of the first splitter, the modified form of gas produced is a gas possessing lower $CO_2$ levels than in the high-$CO_2$ intake gas. This is gas described as partially cleaned. In the case of the second splitter, the modified form of gas produced is purified methane gas. (That is, it is gas that is broadly suitable for use as NG, CNG, ANG and LNG, though recognizing that purity standards for LNG may be substantially higher than for NG, CNG and ANG, such that differentiation in specific purification routines may be selected.)

The first splitter (illustrated in FIG. 1) is a method and/or system for splitting a (dissolved and degassing) high-$CO_2$ gas upflow into two (optionally three) different streams by means of bubble trapping: (i) a lower-$CO_2$ "sidestream" gasflow; (ii) electric power obtained by combustion of the resulting high(er)-$CO_2$ "mainstream" gasflow; and, optionally, (iii) a captured stream of $CO_2$ provided as inflow by the mainstream and also added as a result of combustion of the $CH_4$ carried in it. The first splitter is comprised of: (i) a sub-method or sub-system providing a means of conversion of high-$CO_2$ gas into electric power plus (optionally) a captured stream of $CO_2$, and (ii) a sub-method or sub-system providing a means of dividing an input gasflow into two different fractions, one with substantially lower $CO_2$ (that is $CO_2/CH_4$) relative to the composition of the input gasflow (which may or may not be dissolved in water).

The second splitter (illustrated in FIG. 6) is comprised of two components. The first of these components is a sub-method or sub-system providing a means of conversion into electric power of gas entering into the second splitter from the sidestream created by the first splitter and that possesses a substantially lower-$CO_2$ relative to a high-CO2 input gas entering into the first splitter. This component typically, but not necessarily, includes a gas-purification sub-method and/or sub-system providing a means, by gas cleaning, of preparing gas for transformation into power by chemical reactions liberating hydrogen bond energies from $CH_4$. If this component does include a gas-purification sub-method and/or sub-system, then typically, but not necessarily in the invention, it will be based on cryogenic processing. If gas-purification is included, this component (optionally) may capture a stream of $CO_2$ obtained as a result of gas-purification. The second component of the second splitter is a sub-method and/or sub-system providing a means for purifying, preparing, transferring and either exporting (as pipeline NG) and/or storing methane, sometimes as LNG, and/or sometimes as CNG and/or sometimes as ANG. The sub-method and/or sub-system of purifying methane in this component may be identical to, or the same as, that employed in the first component, or it may be different. Production of LNG requires cryogenic cooling. As illustrated in FIG. 6, cryogenic processing capacities are provided as extensions to, and as integrations with, capacities of a cryogenic Air Separation Unit (ASU) present in preferred embodiments of the invention for which an ASU supplies $O_2$ into oxyfuel combustion. For example, LNG production is supported by supply of LN2 and/or LO2 from an ASU. Reservoirs of LN2 and/or LO2 provide a basis for cooling $CH_4$ into LNG by heat exchange methods and/or systems such as are known to those of average skill in the art of cryogenic gas treating applied to LNG production. The second component of the second splitter includes sub-methods and/or sub-systems providing a means of long-term cryogenic storage of liquefied gases including LNG. This inclusion within the invention of long-term cryogenic storage of liquefied gases including LNG is shown in FIG. 6 by Box B*, where Box B* is defined as the combination of the components shown in Boxes B and C. (Both Box B and Box B* can be known as "the splitter" depending on whether or not it is of interest to focus on processing or otherwise on overall inclusion of all major components.)

Cryogenic gas treatment capabilities and processes are integrated into both the first and second splitters in preferred embodiments. Cryogenic gas treatment capabilities provide oxygen gas used in oxyfuel combustion (in the first splitter) by air separation via an Air Separation Unit (an ASU, which co-produces nitrogen gas, often as a cryo-liquid: LN2). In preferred embodiments, ASU cryogenic gas treatment capabilities, (such as may be adapted and expanded to inter-serve both splitters by persons with average skill in the art of cryogenic gas systems design and implementation) also provide a means of both cryogenic gas cleaning (purification of $CH_4$ mainly by cryo-separation of $CO_2$) and of cooling of cleaned gas to produce LNG. In preferred embodiments, purified gas (flow) within the second splitter, if and when it is not directed into electric power production, may be directed under control for export (sales) as pipeline gas (NG), and/or to be stored and/or sold as Compressed Natural Gas (CNG), and/or to be stored and/or sold as Adsorbed Natural Gas (ANG), and/or to be cryo-transformed into LNG and then stored and/or sold.

In preferred embodiments of the invention, power storage includes and encompasses two different modalities of storing power in gases. These are: (#1) cryogenic power storage (of so-called "cold energy") in cryogenic liquefied gases (which may include any of the following: $O_2$, $N_2$, $CO_2$, $CH_4$-LNG), and (#2) fuel storage as $CH_4$ stored in any form which in some preferred embodiments may be supplemented or replaced by other fuel-type substances (such as $H_2$ and/or methanol and/or formic acid). In preferred embodiments, cryogenic power storage and power release methods are integrated with the cryogenic capacities required for the ASU operation (a component or sub-method and/or sub-system within the first splitter) to provide $O_2$ into oxyfueling of the powerplant within the first splitter. This integration is represented in FIG. 6 as a crossover box linking together Box A with Box B. This crossover box is marked "ASU." Cryogenic storage is represented variously in FIG. 6 within Box C indicating thermally-insulated storage for any or all of the following cryo-liquids: LO2, LN2, LCO2, solid $CO_2$ and LNG. Power release methods and/or systems for cryogenic gases (LO2, LN2, LCO2), as well as for solid $CO_2$ dry ice, are known to persons of average skill in the art of power storage based on cold energy recovery (and of related high-efficiency industrial energy conservation design and management) involving cryogenic processes. Optimized designs wherever possible will utilize maximized temperature spreads. They will seek to utilize waste heat sources such as powerplant exhaust rather than simply use ambient air and water.

Figure 8:
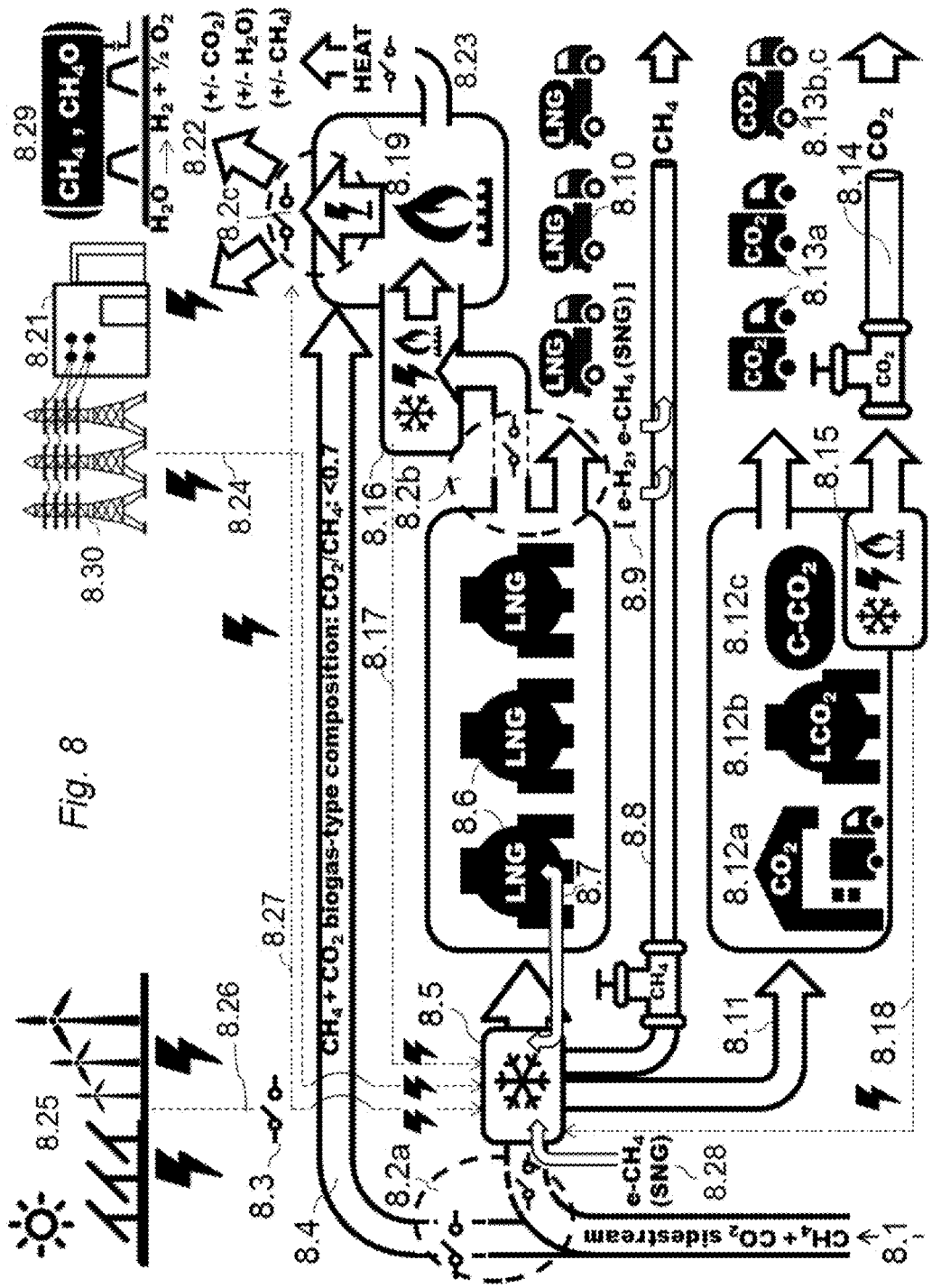
FIG. 8 is a schematic conceptual view showing an extended embodiment of the invention with the view limited to illustrating options for processing and utilizing only the sidestream component of gas (that is involving only the second splitter), and illustrating grid-balancing power storage capacities, including LNG production, storage and sales, and also integration with inputs of renewable power.

It should be noted that power generation (sub-methods and/or sub-systems) differ within the method and/or system of the invention between the first splitter and the second splitter. In the first process splitting, the so-called "mainstream" process utilizes a fueling gas flow that is a high-$CO_2$ gas. Efficient transformation of high-$CO_2$ gases into electric power requires specialized equipment such as oxyfuel turbine systems. These include the combustor-turbine system developed by US company Clean Energy Systems, CES, and Siemens supplied to Maersk oil for use in its "Trigen" system, and the supercritical-$CO_2$ "Allam Cycle" combustor-turbine system built by Toshiba and supplied to NET Power and its associated collaborating companies for integration into powerplant operations. Preferred embodiments of the invention utilize methods and systems broadly of this type for power generation within the first process spitting into two different processing paths. In preferred embodiments, other types of power generators (sub-methods and/or sub-systems) are deployable in that the second splitting of process paths are fed with methane that has been already at least partially cleaned. In preferred embodiments, this at least partially purified methane is provided from two sources. It may be methane that has been highly purified by cryogenic gas cleaning sub-methods and/or sub-systems operating within the second splitting domain of operations ("second splitter"). It may be highly purified methane obtained by vaporization of LNG stored within LNG storage capacities. Or it may be raw or only slightly modified partially cleaned gas obtained from the first process splitting ("first splitter"). High grade purified methane is transformable by chemical reaction processes into electric power by many and various methods, systems and devices such as typically in preferred embodiments, but not necessarily, are gas engines and gas turbines using air intakes for provision of oxygen into combustion. (Methane-fueled fuel cells can be a preferred embodiment if/as desired.) Partially cleaned methane may be transformed into power by ordinary biogas-type (piston) engines and/or by oxyfuel engines. Embodiments of the invention include all such methods, systems and devices, including fuel cells. In some embodiments, gasflow directed to power production within the second process splitting will not be purified. That is, it will not be subject to additional gas cleaning processes within the second splitter. (An example is shown in FIG. 8. See the flux vector identified as item 8.4.) The fueling gas may have a biogas-like $CO_2/CH_4$ composition. Gas with a biogas-like composition can be burned in gas engines rated for biogas. Some embodiments include, within the second process splitting, transformation of gas with a biogas-like composition into electric power by combustion in gas engines rated for biogas, and/or by flame heating of boilers driving turbines.

A preferred embodiment of the invention provides a means for long-term power storage and recovery of stored power by including a large-scale power generating method and/or system in substantial surplus capacity. Such a preferred embodiment utilizes LNG storage in a cryo-fuel depot for long-term backup power in case of any unwelcome and/or unforeseen operations shut-down emergencies such as may occur amongst a large variety of types of possible emergencies. Such a preferred embodiment includes surplus power generating capacity operating upon intake of purified methane from an LNG fuel depot (defined to be within the second splitter, as illustrated in FIG. 6). In a preferred embodiment covering for an emergency, the operations of the first process splitting (first splitter) may be shut down or otherwise substantially diminished. In such an embodiment applied to a shut-down emergency, the dual integrated mode of operation of both process splittings, first and second, operate together in the following way. The second splitter will output power as much as capacity allows utilizing an LNG fuel depot, in order to cover, as much as capacity allows, for the absence of power output from power generation utilizing the mainstream process within the first process splitting domain. (The mainstream main source of power being lost or diminished from a shutdown or output-diminishing malfunction). This form of coordination utilizing LNG in a fuel depot power storage capacity is a peculiar preferred embodiment of the invention in its dual aspect. It operates, however, in situations of shutdown of active operation of the first process splitting domain. In such a circumstance, the preferred embodiment of the dual method and/or system of both splitters acting together will have spanned an interval of time that includes pre-emergency forward-looking preparatory action to build-up a large LNG supply reserve as a means of long-term power storage.

In certain preferred embodiments, capacities for integration of power inputs from renewable sources of power into power storage are included in both the first and second splitters. In some embodiments, inputs of renewable power are integrable (using methods and/or systems known to persons of average skill in the art of electricity grid management incorporating renewable energy inputs) into power input into the ASU within the first splitter. Such inputs also may be extended to operate also within the second splitter in certain preferred embodiments. An ASU typically may be powered at most times by power provided by the oxyfuel gas power plant that the ASU serves by providing $O_2$. Such power used internally by an ASU, however, can be replaced by intake of renewable power at times of high renewable power production such as at times of intense mid-day sunlight. At such times of renewable power intake, the power storage operation of the overall method and/or system of the invention comes into play. In preferred embodiments, power production by the powerplant fueled within the "mainstream" process is directed away from export into the power grid and instead is directed into gas processing and/or into the refrigeration of purified methane into stored LNG, and/or into ASU cryo-processing of air into storage of LO2 and LN2, and/or also into cryo-processing, and/or into compression of captured $CO_2$ into stored LCO2, and/or into compressing and pumping pipeline $CO_2$, and/or into cryogenic production of dry ice $CO_2$.

In additional preferred embodiments of the invention, the second splitter is extended in its capacities (methods and/or systems) to intake and utilize electric power intake from the grid, or from power produced internally by either splitter, or from specialized power intake lines providing renewable (complete or partial) power inputs. In these preferred embodiments, the invention provides a means for absorbing power into production of storable substances that store chemical energy. In these preferred embodiments, power is absorbed by methods and/or systems transforming electric power into stored chemical energy in the form of electro-$H_2$ and/or electro-$CH_4$ (SNG), and/or electro-methanol, and/or other electro-chemicals such as, for example, formic acid. (Many examples are cited in US 2017/0341942 A1.) In preferred embodiments, production of these substances feeds into integration with the power storing capacities of the invention functioning within the second splitter: adding capacities of water electrolysis and $CO_2$ methanation and/or e-methanol production also utilizing $CO_2$. In the case of e-$CH_4$ production, capacity integration within the second splitter is into the cryo-processing of $CH_4$ into LNG. LNG is then transported into LNG storage and/or exported by sales. Produced e-$CH_4$ also can be integrated with in the second splitter into both storage and export of compressed gas (as CNG and ANG) and also into supply of NG pipeline gas outflow-export. This, and all e-substance production modes described in this section are preferred embodiments of the invention as extended capacities integrated into the second process splitting (second splitter) using methods and/or systems and/or purchasable factory units known to persons of average skill in the art of e-$H_2$ and e-$CH_4$/SNG production. Produced e-$H_2$ also sometimes can be admixed into outflow supply of NG pipeline gas outflow-export (as in Germany). This also is a preferred embodiment by extension (of the second splitter), as is utilization of e-$H_2$ to generate renewable methanol utilizing produced $CO_2$ using methods and/or systems and/or purchasable factory units known to persons of average skill in the art of e-methanol production.

Herewith in a single section follows a clarifying overview of the physico-technological basis of the inventive art disclosed herein. Such an overview may be helpful to readers seeking a unifying understanding of basic logics of the inventive art. A physical process the invention utilizes in the first splitter is degassing of dissolved $CO_2$+$CH_4$ mixtures by bubble formation in ascending, depressurizing, water flows. In such water flows carrying high-$CO_2$ bulk compositions, early degassing into bubbles favors $CH_4$ preferential separation into bubbles relative to $CO_2$. The physical mode of compositional fractionation is driven by a high differential in solubility between the two different gases ($CH_4$ and $CO_2$) in water. Bubble trapping in ascending degassing flows therefore provides a basis (sub-method and/or sub-system) for an effectively energy-free separation method and/or system whereby a water borne upward flux of high-$CO_2$ gas can be split into: (i) a partially (mostly) cleaned sidestream of methane-rich gas containing a substantial fraction of the total flux of methane, and (ii) a residual mainstream of gas possessing increased $CO_2$ contamination (viz., with $CO_2$/$CH_4$ greater than that of the initial input gas). For example, data obtained by Tietze in experiments (cited above in the related art section) indicate that depth degassing within an upflow of gas-bearing Lake Kivu deepwater (from 420 meters) provides a gas composition for accumulated bubbles by about 80 meters depth possessing a composition $CO_2$/$CH_4$ ~0.8, degassing out of a gas flux possessing a bulk composition, $CO_2$/$CH_4$ ~5 (for the sum of gas present in both dissolved and degassed states), with the captured degassed gas fraction at 80 meters contained roughly three tenths of the total $CH_4$ flux. Varying the depth of bubble trapping varies the capture fraction as well as the composition of the captured gas. Preferred embodiments include ascending open (non-circulating) extractive flows of deepwater as shown in FIGS. 1 and 2, as well as closed (circulating) cyclical flows with degassing occurring in an ascending branch, as shown in FIG. 5. As used herein, a flow that is "ascending" is upward to some extent such that the pressure on the fluid in the flow decreases as the fluid is conveyed upstream.

An effectively energy-free separability for a partially cleaned gas sidestream by simple bubble trapping methods and/or systems provides useful advantages towards obtaining purified methane from high-$CO_2$ gas sources. For a high-$CO_2$ gas source where cleaning of $CO_2$ is desired to provide cleaned gas, the sub-method and/or sub-system disclosed herein (of sidestream partitioning by bubble capturing) accomplishes most of the task of removal of $CO_2$ with zero energy cost for a gas source that emerges from the Earth at a substantial water depth or under pressure exceeding that of ~100 meters of water depth. No extractive energy cost is required (also in the case of gas present in dissolved form under pressure at depth in Lake Kivu deepwater). This is the first physical basis for the inventive art disclosed herein. A second physical basis for the inventive art disclosed herein is the high thermal efficiency of oxyfuel methods of turbine combustion applied to high-$CO_2$ gas intakes such as via the residual of mainstream gas flux after extraction of a lower-$CO_2$ sidestream (as shown in FIG. 1). The existence of highly efficient oxyfuel gas turbine methods (including but not limited to systems utilizing super-critical $CO_2$ turbine thermodynamics) makes it possible to obtain efficient transformation of a heavily $CO_2$-contaminated methane flux into electric power without need of $CO_2$ removal. (Indeed, increase of $CO_2$ contamination can be an efficiency improvement!) Such methods and systems provide electric power from high-$CO_2$ gas intakes with very high efficiency requiring no from energy investment into $CO_2$ scrubbing (as is required for power generation with conventional engines). A main physical basis of the invention follows from the integrative combination of both efficiencies: (i) obtaining a partially (mostly) cleaned gas fraction in a sidestream by means of effectively energy-free bubble-trapping, and (ii) obtaining electric power (and also, optionally, a nearly pure $CO_2$ flow) from intake of the high(er)-$CO_2$ residual mainstream gas without energy expense for $CO_2$ pre-separation, and with very high thermal efficiency, by means of utilizing advanced oxyfuel turbine combustion methods and/or systems. The second process splitting aspect of the invention operates also with a special type of energy advantage that is linked with oxyfuel turbine combustion sub-methods and/or sub-systems. This advantage is provided by the cryogenic capacities included within oxyfuel combustion methods and/or systems. These are present as a component within the overall operations of the first process splitting aspect of the invention in preferred embodiments incorporating cryogenic oxygen-supplying Air Separation Units (ASU). The advantage is obtained by integration into the second splitter of cryogenic gas-processing capacities present within the first splitter. Such integration capacities require simple modifications of the oxyfuel power generation method and/or system present within the first splitter as a component (sub-method and/or sub-system) that includes cryogenic air separation. The advantage is obtained by integration of these cryogenic capacities between the two splitters. Such an integration can be implemented by persons of average skill in the design and implementation of cryogenic gas processing facilities connected to, and integrated with, gas turbine power generation facilities. The integration is an aspect of the inventive art of the present disclosure in circumstances (preferred embodiments) when cryogenic gas processing capacities are utilized in the second splitter, as is required for (optional) realization of LNG production. The second process slitting (second splitter) purifies gas flow it intakes from the sidestream provided by the first splitter in (an only) partly purified state. In preferred embodiments, cryogenic gas-cleaning methods and/or systems provide an excellent means for gas purification by cryogenic $CO_2$ removal. Such methods and/or systems are available by integration of sub-methods and/or sub-systems of an Air Separation Unit (ASU) across both splitters. In certain preferred embodiments, a capacity included within the second process splitting (second splitter) is refrigeration of purified methane gas into LNG. Both tasks: (i) gas purification to a degree suitable, as needed, for production of purified gas for feeding into combustion within the second splitter, as well as for provision of purified gas for export (as pipeline NG and/or as CNG, and/or as ANG, and/or via precursor gas input into LNG production), and (ii) LNG production by refrigeration of purified gas; both are benefitted by a roughly free service obtainable by integrative linkage into the second splitter of ASU cryogenic gas processing capacities and outputs of LO2 and LN2 provided by the first process splitting (first splitter). (That is, in so far as cryogenic ASU operations typically generate excess cold energy in the form of liquefied nitrogen gas, LN2.) Efficient power storage capacities also follow from the production and storage and vaporization of cryogenic gases (LO2, LN2, LCO2, LNG) as power stores, as well as production and storage and desublimation of cryogenic solid $CO_2$ as a power store. Power storage capacities incorporated as preferred embodiments of the invention include the modality of fuel storage, especially as cryogenic LNG and also as CNG if desired, and also, if desired, as e-methanol and/or as e-formic acid. Power storage capacities incorporated as preferred embodiments of the invention also include "cold energy" storage modes in both phase change and temperature-lowering aspects applicable and usable for all of the cryogenic gases noted herein, and also for solid $CO_2$, as well as for liquefied air. Therefore, power storage is another advantage obtained by integration of cryogenic capacities of the first process splitting domain into the second process splitting domain present in some preferred embodiments. This integration, focused on power storage, is another aspect of the inventive art disclosed herein. Power storage provides a basis for provision of grid-balancing services by means of power output modulation control. Power storage also provides a basis for intake of irregular renewable power inputs, thereby providing additional grid-balancing services comprising both intake of renewable power inputs and overall power output modulation control within a certain range determined by scales of power storage capacities in relation to scales of power output capacities. Integration of cryogenic capacities of the first splitter into the second splitter provides integration of such aspects of utility in power storage: (i) grid-balancing controllable power output modulation; and (ii) additional grid-balancing by intake and storage of irregular inputs of renewable power, sometimes with inclusion of production of energy-storing substances such as e-$H_2$, SNG, electro-methanol, electro-formic acid and other energy-storing chemicals providing a means of energy storage in components made with inputs of $H_2$ obtained by electrolysis of water and/or by other water-splitting methods yielding $H_2$. Preferred embodiments of the invention include capacities for utilization of each of these storage modes and substances individually and/or in any combinations. This integration of power storage capacities providing a means of provision of grid-balancing services, including incorporation of management of irregular renewable power inputs, is another aspect of the inventive art disclosed herein and represents preferred embodiments of the invention including utilizations of each of the storage modes and substances noted above individually.

The invention is described in following by descriptions explicating the illustrating figures in the order of their series. Items within each figure are denoted by numbers of the type x.y, where x is the figure number, and y is the item number within that figure.

FIG. 1 is a schematic view in a vertical plane showing a preferred embodiment that illustrates one of the core inventive aspects of the invention, herein named as the first process splitting (or "first splitter"). The figure illustrates a method and/or system for splitting a high-$CO_2$ gas upflow in water (initially dissolved) into two (optionally three) different output streams by means initially of bubble trapping by a bubble trapping device (1.6). The upflow is represented as contained within a vertical pipe-like system or device (1.1), which is a preferred embodiment. In some preferred embodiments, contained flow is contained in non-vertical systems and/or in systems comprised of vertical and non-vertical sections, and/or in systems that are non-pipe-like in respect of being non-circular. Also, as is shown in subsequent FIGS. 3 and 4) as well as in the inventor's disclosure in U.S. Pat. No. 9,732,671, upflow systems including bubble trapping devices include modes of flow variously directed to trap bubbles, and that, according to their structures, diverge from vertical pipe-like systems. Some embodiments utilize pipes proceeding partly along the bottom of a waterbody (such as Lake Kivu) following its rising underwater topography to near-to-shoreline operations. As shown in FIG. 1, upward flow initiates at some (here unspecified) depth in a regime of gas under saturation without bubble nucleation. Upward flow proceeds upwards depressurizing until a "bubble line" is reached, shown at depth D1 (the difference between 1.3 and the surface: 1.5). Degassing may occur naturally in some embodiments. In some other embodiments, degassing is stimulated by one or more devices located at one of more levels within the upflow (not shown here, but described in the inventor's disclosure: U.S. Pat. No. 9,732,671). In the example illustrated in FIG. 1, flow proceeds upwards by means of auto-siphoning with sufficient pumping power to lift dense deepwater in an upward flow driven by bubble formation. Preferred embodiments utilize such auto-siphoning. In some other embodiments, pumping power may be assisted by methods and/or systems known to persons of average skill in the art of pumping flows of water and/or of mixed flows of water and gas. Auto-siphoning also may be assisted by the application of pumped vacuum degassing at the location of the gas-capturing degasser (1.9), as was disclosed in U.S. Pat. No. 9,732,671. The first of the split streams in the (sub-method and/or sub-system of the) first process splitting (first splitter) is a lower-$CO_2$ "sidestream" (1.7) gasflow component. It is provided by a flux of degassed gas obtained by a bubble trapping device (1.6) situated as some depth (D2, being the vertical distance separation between levels 1.5 and 1.4, where level 1.5 is shown as the surface of a waterbody, but is not limited to be so. As illustrated, one bubble trapping device (1.6) is shown and is a preferred embodiment. Other embodiments may, as desired, incorporate multiple bubble trapping devices feeding fractionated degassed gas into one of more extraction pipes, proceeding in a separate extraction, or in collected together gas extraction modes. The second of the split process streams is called the "mainstream." Both sidestream and mainstream processing paths are supplied with gas by an upward depressurizing waterflow (1.2a) sourced at depth as illustrated for the case of Lake Kivu, but may be supplied alternatively as a gasflow injected into water in other preferred embodiments as shown in FIG. 5 illustrating an application to high-$CO_2$ well gas inputs. As illustrated, gas-water separative splitting proceeds by upwards (depressurizing and degassing) passage of water through a bubble trapping device (1.6) acting as a gas-water separator. The mainstream forms as a consequence of gas-water separative splitting in all embodiments of the invention. In the figure, the mainstream flow is labeled 1.2c. The mainstream, as defined herein, ends differently from a simple flow of upward-degassing gas and water. It ends as a product flow of electrical power (1.12) and, optionally and additionally, a product flow of captured $CO_2$ (1.13). Therefore, the mainstream, as defined herein, includes transformations. These transformations are: first, (i) passage of a flux of (foaming) mixed gas and water through a gas-capturing degasser (1.9, optionally in a variety of modes such as were disclosed for Lake Kivu application in the inventor's disclosure: U.S. Pat. No. 9,732,671); followed second, by (ii) a gas flux proceeding from the gas-capturing degasser (1.9); followed, third; (ii) by intake into, and conversion within, a combustive power-converting method and/or system (1.11) following any appropriate clean-up steps (not shown, and such as may be desired according to ordinary practices known to persons of average skill in the art of design and implementation of gas feeds into combustion for $H_2S$ removal and/or water vapor removal). In some preferred embodiments, the termination of the "mainstream" flow (1.2a,b,c) may be either above or below the surface of a waterbody. Or the method and/or system may be implemented on land in some embodiments. Electric power output (1.12) is obtained by combustion of the "mainstream" gasflow component (1.10) which, according to mass balance, will degas gas with a higher level of associated contaminating $CO_2$ than in the initial dissolved inflow (1.2a) containing (dissolved) high-$CO_2$ gas. Efficient conversion of high-$CO_2$ gas into power (within 1.11) requires specialized methods and/or systems. In preferred embodiments of the invention, these are oxyfuel turbines. Oxyfuel turbines herein are defined are defined as sub-methods and/or sub-systems inclusive of air separation capacities providing oxygen for oxyfueling. Typically, such air separation capacities are provided by cryogenic Air Separation Units (ASUs). A cryogenic ASU is included within item 1.11 (a combustive power-converting method and/or system) in preferred embodiments of the invention, but is not shown in FIG. 1 Box A indicates product outputs on the first splitter: partially-cleaned sidestream gas (1.7), electric power (1.12, generated by 1.11), and, optionally, a stream of captured $CO_2$.

FIG. 1 represents a situation appropriate to Lake Kivu where deepwater containing abundant dissolved gas rises (1.2a) within a pipe (1.1) either from the position marked (as 1.1) or some lower-down intake sector (cf., FIG. 2, item 2.1 for an example. An alternate type of situation is shown in FIG. 5, where gas is injected (5.1, 5.17) into a closed-loop water circulation. It is possible for gas to be injected at depth (and thence to dissolve) into an up-flowing open flow situation such as is exhibited in FIG. 1. The invention can operate by injection and dissolution of (typically: well-derived) gas in an open system, as shown in FIGS. 1 and 2. For simplicity, an injector option is not shown in FIG. 1. It herewith is identified as possible for practice of the invention, utilizing an injector as is shown in FIG. 5 (items 5.1, 5.17).

FIG. 2 is a schematic view in a vertical plane showing a preferred embodiment of the invention within a Lake Kivu gas and power production operation (as illustrated in the inventor's disclosure: U.S. Pat. No. 9,732,671). The box indicates a core inventive aspect of the invention included within a second process splitting sub-method and/or sub-system ("second splitter," cf., FIG. 6): cryogenic gas storage providing stock for export (2.28) as a means of cryogenic power storage (2.30, 2.29), including LNG (which is identified within the long dashed box). LNG provides power storage by fuel stockpiling. In a preferred embodiment for cases of shutdown or diminution of extractive fuel feeding, stockpiled LNG fuel may be fed (2.29) into the system's (oxyfuel) power generator (2.9) with co-feeding of $O_2$ stored as $LO_2$ and, initially for start-up, $CO_2$ stored in any form. In another preferred embodiment suitable for cases of full system shutdown or diminution of output, stored LNG is fed (2.29) into a non-oxyfuel power generating method and/or system (2.92) as a mode providing back-up power. The first splitter as shown in FIG. 1 here in FIG. 2 shown integrated within the inventor's wider method and system of Lake Kivu gas extraction and power production disclosed in U.S. Pat. No. 9,732,671. FIG. 2 in particular shows the integrative addition of cryogenic processing (2.26a) of separated "sidestream" gas (2.24 with processing represented in the top left corner within a box labeled 2.26), into CNG and/or ANG (2.27) and LNG. LNG export (2.28) also is shown, as is cryogenic storage of LNG (shown within 2.30). Deepwater intake at a depth (2.32, 2.33) enters (2.1) into an upflow system (2.3) entering into a degassing zone (2.4) within which a bubble trapping device (2.2), (or devices), located at a selected depth (2.25, 2.34) splits the gas flux into an extracted sidestream (2.24) and a residual mainstream flowing upwards through optional bubble extractors (2.35), (serving an entirely different purpose with respect to compositional stream splitting) into a foam fractionator (2.5) within a gas-capturing degasser (2.6), located near the surface (2.31). This fractionator (2.5) separates gas from water. It utilizes a gas pump (2.7), if and as desired (cf., U.S. Pat. No. 9,732,671), providing vacuum pull to assist degassing to feed a flow (2.8) of unseparated mainstream high-$CO_2$ gas into a power-generating method and/or system appropriate to high-$CO_2$ gas intake and conversion into power (2.9), and producing outputs of electric power (2.10) and, optionally also, captured $CO_2$ (2.11). Unlabeled items and details pertaining to the processing and return flow of degassed deepwater are present in U.S. Pat. No. 9,732,671. (Item 2.36 represents a bio-products and mineral precipitates harvesting/extraction unit summarizing such processes.) The integration of a first splitter into Lake Kivu gas extraction and utilization operations is a preferred embodiment of the invention.

Figure 3:
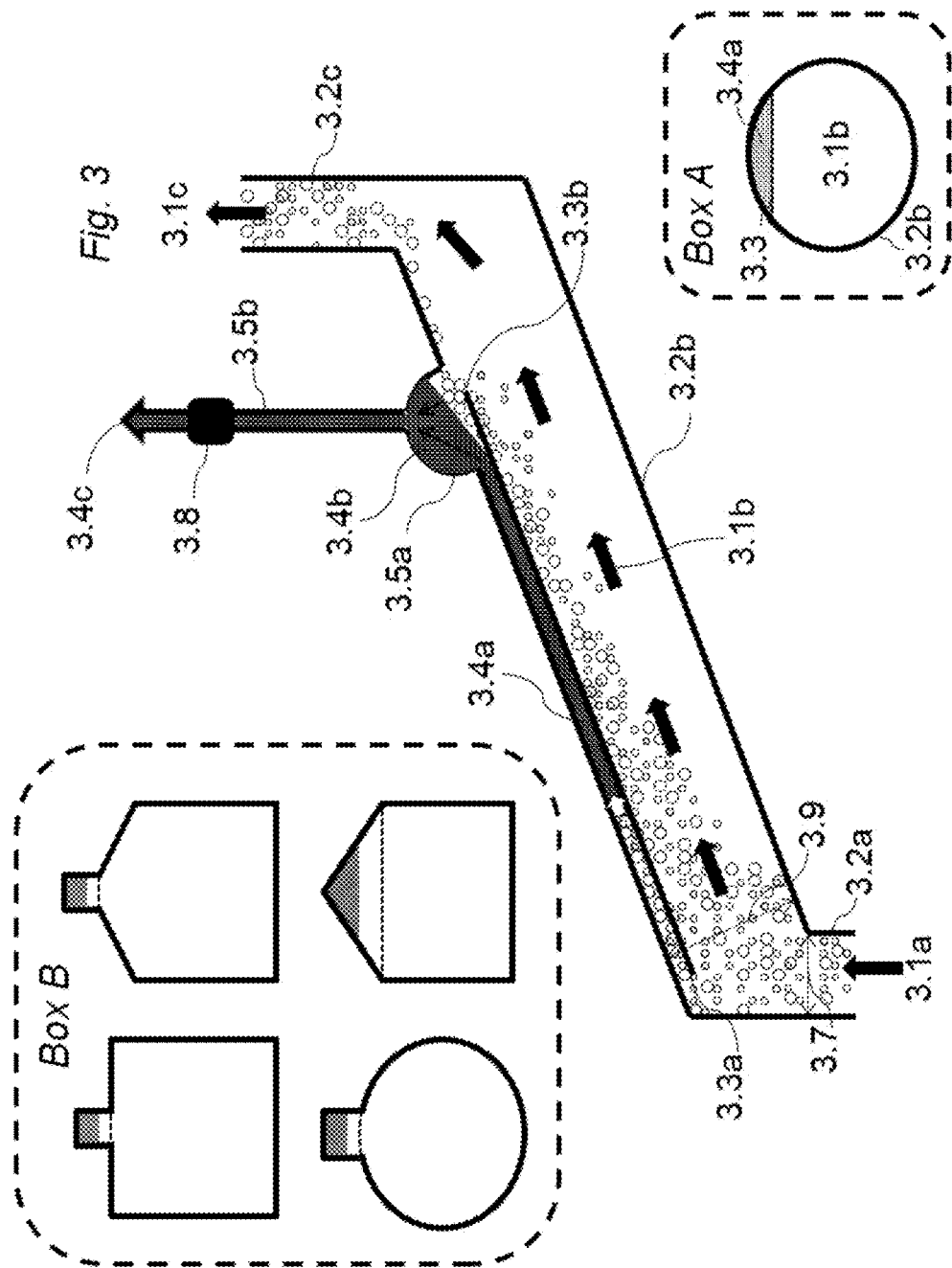
FIG. 3 is a schematic view in vertical plane illustrating a preferred embodiment type of bubble trapping device, a pipe-like gas/liquid separator.

FIG. 3 is a schematic view in vertical plane illustrating a preferred embodiment type of first splitter bubble trapping device such as it represented in FIG. 1 by item 1.6 (which does not illustrate horizontal displacement in the upward flow by the interposition of a bubble trapping device as is shown in this figure). What is shown is a pipe-like (3.2a,b,c) bubble-trapping gas/liquid separator. It utilizes an upward slant positioning. It also utilizes an increase in cross-sectional area in the separator (as shown by dimensional expansion: 3.7 to 3.9). This provides flow-slowing (3.1a flow input to 3.1b flow throughput back to 3.1c flow output) to assist bubble-trapping for gas extraction (3.4a,b,c) by means of a gas collection channel (3.3a to 3.3b) feeding into a gas collector (3.5a) feeding collected gas (3.4a to 3.4b) into a gas extraction upwards transfer pipe (3.5b) controlled by value control (3.8). The two boxes (Box A and Box B) illustrate a representative range of possible sectional views of different flow chamber shape types with associated gas collecting channels shown at their tops. Box A provides detail for a simple pipe (3.2b). The pipe is modified by a mesh-like porous partition (3.3). Separated gas (3.4a) passes through and collects and flows above the partition into a gas collector (3.5a in the main diagram). FIG. 3 illustrates a preferred embodiment, which is a type of possible bubble-trapping sub-method and/or sub-system, but the invention is not limited to such types. Any bubble trapping method and/or system can be applied such as is known to persons of average skill in the art of gas/water separation by means of bubble separation. Another example of a type of bubble-trapping device is illustrated in FIG. 4.

Figure 4:
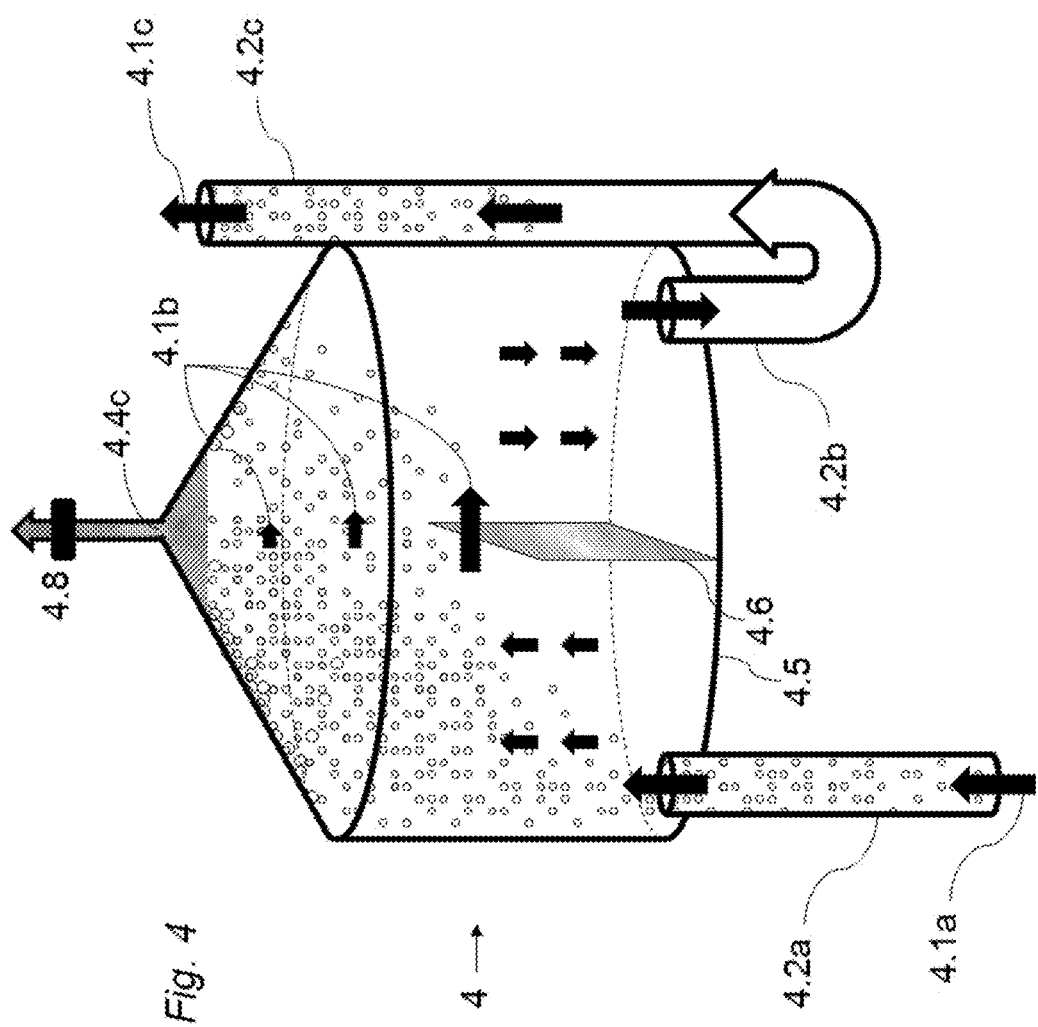
FIG. 4 is a schematic view in vertical plane illustrating a preferred embodiment of a different type of bubble trapping device utilizing a vertical cylindrical chamber with a gas-collecting conical top.

FIG. 4 is a schematic view in vertical plane illustrating another preferred embodiment of a type of bubble trapping device (4). The type of bubble trap shown utilizes a vertical cylindrical chamber possessing a gas-collecting conical top (4.5). As shown, pipeflow containing and degassing bubbles with decompression proceeds upwards (4.1a) through a pipe (4.2a) into the flow-containing bubble-trapping device (4). Bubbles in the flow rise upwards relative to the flow. They are trapped and collected as gasflow (4.4c). Waterflow from which bubbles have been extracted exits the device initially downwards via an exit pipe (4.2b). It then proceeds through a 180 degree U-turn into an upward flow (4.1c) within an upflow pipe (4.2c). Gas extraction from the device is controlled by a control valve system (4.8). The direction of water flow inside the device is constrained to flow initially upwards by the presence of a flow-constraining partition (4.6). Other types of bubble trap are included as embodiments of the invention (such as, for example, the type disclosed in a figure in the inventor's disclosure: U.S. Pat. No. 9,732,671). Any effective type may be used. FIGS. 3 and 4 illustrate bubble-trapping separation occurring within different types of systems. The selection of type of bubble trap for implementation in particular circumstances may be made by persons of average skill in the art of gas-water separation, including degassing up-flows of liquids.

FIG. 5 is a schematic view in a vertical plane showing a preferred embodiment of the invention involving application to (as shown: offshore) processing and utilization of high-$CO_2$ well gas (5.1). High-$CO_2$ well gas is injected and dissolved at depth (5.22) into a closed loop water circulation device (5.15$a,b,c$) that is connected, up-flow (5.16$a,b$) to downflow (5.16$d,e$) by a gas-capturing and gas-liquid separating degassing device (5.18) located above the water surface (5.20). Water separated from gas (5.16$c$) within the degasser (5.18) flows to the right to join the closed-loop circulation (5.16$a,b,c,d,e$). As shown, the upflow part (5.16$a$) of the closed loop circulation generates decompressive degassing in its upflow. The upflow-containing part (5.15$a$) of the closed loop water containing device (5.15$a,b,c,d,e$) includes a first process splitting type of gas/water separator operating by means of bubble trapping (5.6) of gas in bubbles into a sidestream containing pipe (5.7) controlling sidestream gasflow (5.8) under valve control (5.10). A bubble-trapping device (5.6) is located at a depth (5.21) selected for a desired gas stream splitting aspect. This position depth (5.21) for gas stream splitting into sidestream and mainstream typically, but not by necessity, will be under control within some limits of mobility. The first splitter is created by stream fractionation consequent of the presence of a bubble-trapping device (5.6). A mainstream begins as a degassing upward flow (5.16$b$) above bubble-trapping device (5.6). The mainstream upward flow (5.16$b$) proceeds upwards, continuously degassing, into a gas-capturing degasser foam fractionator (5.18), out from which a "mainstream" of separated gas flow (5.14$a$) is extracted by a gas pump (5.13$a$), thereby providing mainstream gasflow (5.14$b$), (such as may variously be pre-treated by processes that are not indicated in the figure) into a power generating method and/or system (5.9) capable of utilizing high-$CO_2$ mainstream gas. This generator (5.9) is represented as an oxyfuel turbine system possessing a cryogenic ASU capacity (5.10, shown separately, but integrated) providing oxygen into oxyfueled combustion. The generator (5.9) transforms the mainstream flux of high-$CO_2$ mainstream gas into a mainstream output flux of electric power (indicated as icons). The generator (5.9) also produces, optionally, mainstream co-product flux of captured $CO_2$ (5.11) such as may be utilized (5.14, including for downward geosequestration) and/or exported by pipeline, or as a cryogenic liquid and/or solid (5.19). (CCU is an acronym for Carbon Capture Utilization.) Decompression of high-pressure high-$CO_2$ well gas that is injected and dissolved into a water upflow (5.16$a$), as shown, is shown generating power by a turbine-based sub-method and/or sub-system of energy transformation from fuel combustion to rotary power to electric power (5.17). This adjunct aspect of power production is an optional preferred embodiment of the invention applied to utilization of high-pressure well gas inputs. Additional adjunct hydrodynamic power extraction is shown by item (5.24) and represents a preferred embodiment. It represents a sub-method and/or sub-system providing a means of extracting power from a head of water pressure. This head is supported by foaming waterflow passing over a partition (5.25). A substantial water head may be created by auto-siphoning stimulated by vacuum pumping (5.13$a$) in mainstream gas extraction. (Additional details of such a power extraction system are described in the inventor's disclosure: U.S. Pat. No. 9,732,671.) The presence of a second process splitting (second splitter) sub-method and/or sub-system is only partly indicated by the presence of cryogenic processing (5.12) purification of the sidestream gas (5.8), shown as optionally being transformed into LNG, which is denoted as an export flux (5.19). Cryogenic processing capacities are indicated in application to gas-cleaning of sidestream gas (5.12), as well as to LNG production. These processing capacities are provided by integration of cryogenic capacities of an ASU (5.10), an ASU being included amongst the internal components of the oxyfueled electric power generating method and/or system (5.9). For reasons of clarity in representation, power storage aspects of the second process splitting sub-method and/or sub-system (second splitter) are not illustrated in this figure. FIG. 5 illustrates application of the invention to high-$CO_2$ well gas emerging from the solid bottom underwater at depth (though on land practice also is possible by means of appropriate structural supports below and/or above ground such as can be developed by persons of average skill in the art of engineering large water-containing industrial structures).

FIG. 6 is a schematic conceptual view illustrating the invention as means of variable power output control utilizing a (presumed) constant flow input of high-$CO_2$ gas (6.1) into the overall system. (This input flux is shown as an input flux arrow at the bottom left). The figure illustrates the integrative combination of two sub-methods and/or sub-systems herein described as the "first splitter" (6.2) and the "second splitter" (6.3). (Components are described and labeled numerically in other figures. FIG. 6 illustrates process relations and integrative functionality providing power output control. For clarity in this aspect of illustration, the figure suppresses a components-based perspective. Verbal descriptions in this section describe process actions and relations by reference to a few simple icon signifiers visually indicating flow transfers, power outputs, gas-to-power conversions by combustion, cryogenic process activity and outputs, gas storage and export.) A constant power output (6.4) from the first splitter is indicated by a labeled flux arrow emerging upwards from the first splitter. A variable power output (6.5) from the second splitter is indicated by a labeled flux arrow emerging upwards from Box B of the first splitter above a flame icon (6.6) representing combustion in a power generator. Note that this power generator in the second splitter is different from the power generator in the first splitter. It utilizes an input of fully purified sidestream gas, whereas the power generator in the first splitter utilizes $CO_2$-contaminated gas flux of the mainstream process path. Gas stream splitting by the first splitter is indicated by a splitting flux arrow (6.7) positioned within the middle of Box A. It labels the split components of the gas flux as: (mainstream output proceeding upwards:) "1: gas-to-power" for "higher-$CO_2$ gas," and (for the sidestream output proceeding rightwards into the second splitter) as "2: lower-$CO_2$ gas." Power output control is obtained from the integration of both splitters. The first and second splitters are represented iconographically as process splittings within two dashed labeled boxes, Box A and Box B*, respectively. FIG. 6 is provided to illustrate the process operation of these splitters acting in integration with one another. The figure illustrates how the integration of a first splitter and a second splitter creates a capacity for variable power output control. This is by means of control over the trajectory of the sidestream gas flow within the second splitter (though for simplicity, control systems are not indicated). Control may be viewed in the figure as control over degrees of splitting within the second splitter. Degrees of splitting are selected, as desired, within a control range. This range is between endpoint options of: (i) full combustion of the gas flux in the sidestream to produce maximum electric power output by full utilization of the (variable) power generating capacities of the second splitter's power generating method and/or system (indicated by a flame icon), and (ii) full storage and/or export of the gas flux of the sidestream (which may be as LNG and/or as CNG and/or as exported pipeline NG, as indicated by labeled arrows and icons). Full combustion of the sidestream into power effects maximum power output. Full storage and/or export of the gas flux of the sidestream effects minimum electric power output and maximum power storage (within Box C). The existence of gas storage (Box C) within the second splitter (Box B*) creates a means simultaneously to produce, if desired, maximum power output from the second splitter while simultaneously directing full storage and/or export of the gas flux of the sidestream. The cross integration of cryogenic capacities of the ASU is indicated by a box labeled ASU (6.8) crossing between the splitters and providing $O_2$ into power generation within the first splitter. The ASU also is illustrated (by a box overlap connection with an open corner) providing cryogenic gas cleaning and LNG production within the second splitter. The ASU also is indicated producing $LN_2$ and $LO_2$ flux into cryo-storage (shown as icons within Box C). Such cryo-storage of $LN_2$ and $LO_2$ produced by the ASU stores "cold energy" as an additional means of power storage different from $CH_4$ fuel storage as LNG and/or CNG and/or ANG. Box C additionally indicates (optional) cryogenic power storage in the form of $CO_2$ indicated as storable in the form of $LCO_2$ (that is stored as a cryo-liquid as indicated by a cryo-tank icon) and as solid $CO_2$ (indicated by a storehouse icon with export capacity of dry ice indicated by a truck icon within it). $CO_2$ production is indicated by labeled flux arrows (6.9, 6.10) emerging from both the first splitter (that being captured $CO_2$ from oxyfuel combustion) and the second splitter (that being $CO_2$ obtained by cryogenic cleaning of $CO_2$ from purification of the "lower-$CO_2$" gas flux of the sidestream transferred from the first splitter to the second splitter).

Figure 7:
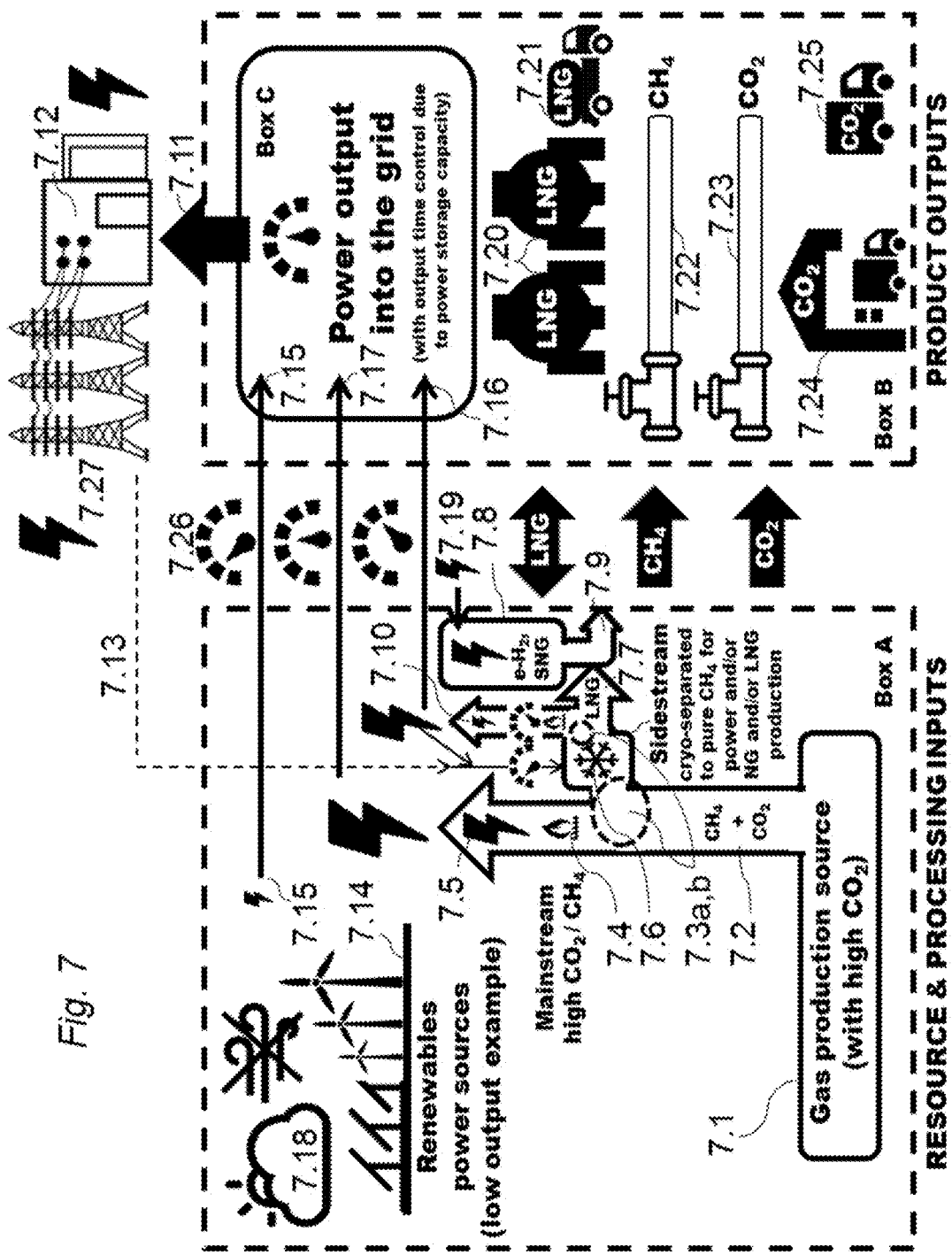
FIG. 7 is a schematic conceptual view showing an embodiment of the invention including both splitters but represented divided into inputs and outputs, and illustrating power storage grid-balancing with inclusion of irregular renewable power inputs.

FIG. 7 is a schematic conceptual view showing the invention in its full integration aspect differently with respect to FIG. 6. FIG. 6 illustrates how the two splitters (7.3a first splitter on the left, and 7.3b second splitter on the right) integrate with one another. FIG. 7 alternatively represents division of the invention according to inputs and outputs, including especially controlled power output linked with a capacity (illustrated in the figure) for intake and storage of irregular (7.18) renewable power (7.14) inputs (7.15). Inclusion of capacities for acceptance and management of irregular renewable power inputs (Box C) is a preferred embodiment of the invention. Control over power transferring is represented indicated by a stack of three metering icons (resembling automobile fuel gauges: 7.26). These meters are associated with arrows representing power inputs from the first splitter (7.17), the second splitter (7.16), and also integrating power inputs (7.15) from irregular (7.18) renewable power sources (7.14). FIG. 7 also illustrates integration of another mode of power storage: electro-production of energy-storing (7.19) "electro-chemicals" (7.8) such as, for example, labeled: e-$H_2$ and e-$CH_4$ (=Synthetic Natural Gas: SNG). (Cryogenic storage of $H_2$ is possible but not indicated. In some European jurisdictions, e-$H_2$ is sold as a supplemental gas admixture into the NG pipeline grid.) Inclusion of power storage by means of electro-production of power-storing "electro-chemicals" is a preferred optional embodiment of the invention. Resource and processing inputs are illustrated within Box A. Input of high-$CO_2$ gas (7.2) from a tapped high-$CO_2$ source (7.1) proceeds into a first splitter (7.3a) wherein the mainstream is directed (upwards as represented by a flow vector) into combustion via a power generator (indicated by a flame icon: 7.4) yielding a (constant) mainstream power output (7.5). Power output from the mainstream is transferred (7.17) into an electric power management unit (sub-method and/or sub-system such as may be determined by persons of average skill in the art of electrical supply management) identified as Box C. The separated sidestream of gas flux from the first splitter flows rightwards in the figure into cryo-separation (7.6). Cryo-separation removes $CO_2$ yielding purified $CH_4$ gas (7.7 labeled LNG in the rightwards flow towards storage, but here specified also to include, if and as desired, alternative forms of gas such as pipeline methane (7.22), and/or CNG and/or ANG. A power vector (7.13) originating in the grid (7.27) indicates that grid power can be utilized to power ASU operations if/as desired as a mode of grid-balancing. Another arrow indicated that internally produced power alternatively can be used to power ASU operations. From cryo-purification, purified gas produced as a flux under flow control by the second splitter (7.3b) may be directed either into storage (rightwards vector arrow), or immediately into combustion (upwards vector arrow). The path for immediate power production via combustion is represented as an upwards vector containing a flame icon and a meter icon representing control. Gas flux flowing on this path yields a controlled power output transferred (7.16) into an electric power management unit identified as Box C. Purified gas flux proceeding under control into storage and/or export is represented by a rightwards arrow marked "LNG" (7.7). A range of representative stored and exported product outputs is illustrated by icons: LNG (stored: 7.20; exported: 7.21), pipeline methane (7.22), pipeline $CO_2$ (7.23), dry ice (7.24) and truck-exported $CO_2$ (7.25) which may be compressed $CO_2$ or cryogenic $LCO_2$ or cryogenic dry ice. FIG. 7 illustrates how an integration of a first and second splitter provides a basis for grid-balancing via the operation of a electric power management unit (Box C) internal to gas production and utilization operations. A corresponding capacity for electric power management is represented (7.12) in association with an external power grid (7.27). Capacities for storage and recovery of cryogenic "cold energy" are not illustrated in this figure. They have been left unrepresented only to avoid adding excess complexity into the figure. Representation of these capacities is included in FIG. 8 limited in view to the second splitter.

FIG. 8 is a schematic conceptual view showing a part of the invention limited to processing and utilizing the sidestream component of gasflow (8.1). Therefore, it illustrates aspects of the "second splitter," such as is illustrated in integration with the first splitter in FIG. 6. FIG. 8 illustrates only the second splitter and its power storage and power management capacities interconnecting with an external electric power grid and including inputs of irregular renewable power (8.26). Power storage control is useful for provision of grid-balancing services. It is needed especially for integration of expanding inputs of irregular renewable power. Power storage capacities are illustrated in FIG. 8, including LNG production and storage (and sales), and also cryogenic power storage of "cold energy" in LNG and $CO_2$. Power storage by means of electro-production of "e-chemicals" (8.22) is also illustrated in FIG. 8 integrated into the method and system of the invention. This (optional) integration represents a preferred embodiment of the invention. Electro-production of "e-chemicals" proceeds initially by water electrolysis (generating e-$H_2$ and e-$O_2$). For SNG production, this is followed by $CO_2$-utilizing methanation of e-$H_2$ into SNG and/or by methanol production ($CH_4O$), (8.29) by well-known standard catalyzed methods known to persons of average skill in the art of electro-methanol production. A possibility for use of direct or byproduct heat to produce syngas and products based on syngas also is included as an additional modality of power storage (8.23), and is a preferred embodiment of the invention. A variant situation is shown where sidestream gas (8.1) may simply be directed (via control 8.2a into path 8.4) to be combusted directly without pre-purification (in 8.19). This is possible with biogas engines for a biogas-type composition: $CO_2$/$CH_4$: <0.7. (Power production by piston engines burning gas with biogas-like compositions obtained from Lake Kivu deepwater has been practiced extensively on Lake Kivu, especially in the "KP-1" powerplant on Cap Rubona.)

FIG. 8 illustrates three process selection-switching options: 8.2a,b,c, all existing within the sub-method and/or sub-system of a second process splitting (second splitter). In all three locations, control is indicated by small switch icons (surrounded by dashed ovals). These switches are meant indicate both on-off control and also fractional partitioning control shunting a proportion of flow one way and the remainder of flow the other way. All of these process path and switch options, as shown, represent preferred embodiments of the invention. The first (8.2a) option is direct combustion of sidestream gas (8.1, 8.4) to produce electric power (via combustion in a generator, 8:19, without pre-purification) or, alternatively, cryogenic purification (8.5) of sidestream gas to produce LNG to be stored (8.6) and/or exported (8.10). [Note that an implicit option that is not shown is production of purified gas rather than LNG. This has been illustrated in previous figures (e.g., in FIG. 6). Purified gas can be converted into power or stored as LNG or CNG, or exported as pipeline methane (8.8).] With cryo-purification (8.5), a stream of captured $CO_2$ (8.11) is also co-produced. It is stored and/or exported as (dry ice: 8.12a) and/or LCO2 (8.12b) and/or compressed $CO_2$ ("C—$CO_2$") exportable by pipeline (8.14) or tanker truck (8.13b). A second option illustrated in FIG. 8 is located at position 8.2b. This location exhibits splitting control directing stored LNG into power output via a power generator (8.19) or into export (8.10). A third option illustrated in FIG. 8 is located at position 8.2c. This location is at the power output of the power generator (8.19, noting that this is a generator-type utilizing purified gas, or possibly bio-gas, but not high-$CO_2$ gas). Control at this location (8.2c) is between power export into the grid (8.30), and electric power directed into power storage via electrolytic production of e-$H_2$ (8.22) then flowing to production and storage (or export) of SNG (8.29) and/or electrolytic methanol (8.29). Note that a power link (8.27) from renewable power sources (8.25) allows power to be shunted into this same e-substances power storage mode. Selection of specific methods for energy storage by production of e-H2, SNG and e-methanol and other "electrochemicals" may be decided by persons of average skill in the art of energy storage by production of e-$H_2$, SNG, e-methanol and other "electrochemicals." Note that item 8.9 shows these substances being exported admixed into pipeline methane.

Item 8.28 shows produced e-$CH_4$ being shunted into cryogenic LNG production as an alternate storage option. Item 8.7 indicates optional use of stored LNG for cryo-purification. Two locations within FIG. 8 illustrate recovery of cryogenic cold energy. ("Cold energy" storage and recovery have been illustrated elsewhere in the figures utilizing LN2 and LO2.) The first (8.15) shows an energy recovery loop (8.18) whereby cold energy "invested" into cryogenic production (8.5) of cryo-stored $CO_2$ (8.12 a,b) is recovered upon warm-up to supply pipeline $CO_2$. The recovery method and/or system (8.25) is shown as a thermodynamic engine utilizing waste heat and operating off of the state difference between cryo-stored $CO_2$ and $CO_2$ in the gas (or supercritical) state. Selection of specific methods for cold energy recovery utilizing $CO_2$ may be decided by persons of average skill in the art of cryogenic energy storage and recovery utilizing $CO_2$. Item 8.21 indicates a method and/or system for capacity for electric power management. As shown in the previous figure such capacities typically will be necessary both within the invention for internal power management as well as externally within the power grid. Renewable power sources also may be connected by special HVDC long-distance lines in which case, converters are required for intake. Specific aspects of such integration of renewable power inputs is an ordinary matter for grid management involving renewable power sources, but is not described or disclosed herein as an aspect of the invention other than to emphasize that the invention provides a basis for grid-balancing of renewable power sources. An example is a Lake Kivu greentech "hub" operation as disclosed by the inventor in: US 2017/0341942 A1.

Figure 9A:
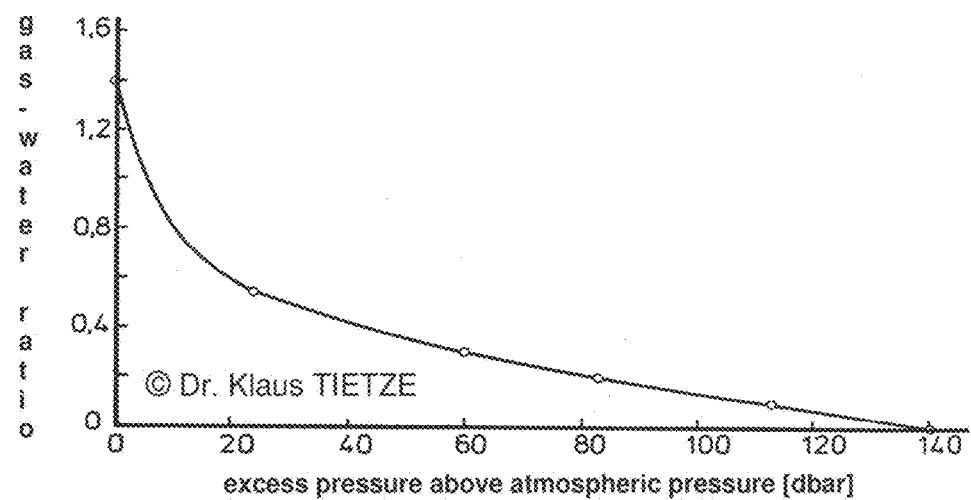
FIGS. 9A, 9B, 9C and 9D are graphs relating to gas composition separation from Lake Kivu deepwater which are from a report of Dr. Klaus Tietze (2000) reproducing diagrams from an earlier publication, Tietze and Maier-Reimer (1977).
Figure 9B:
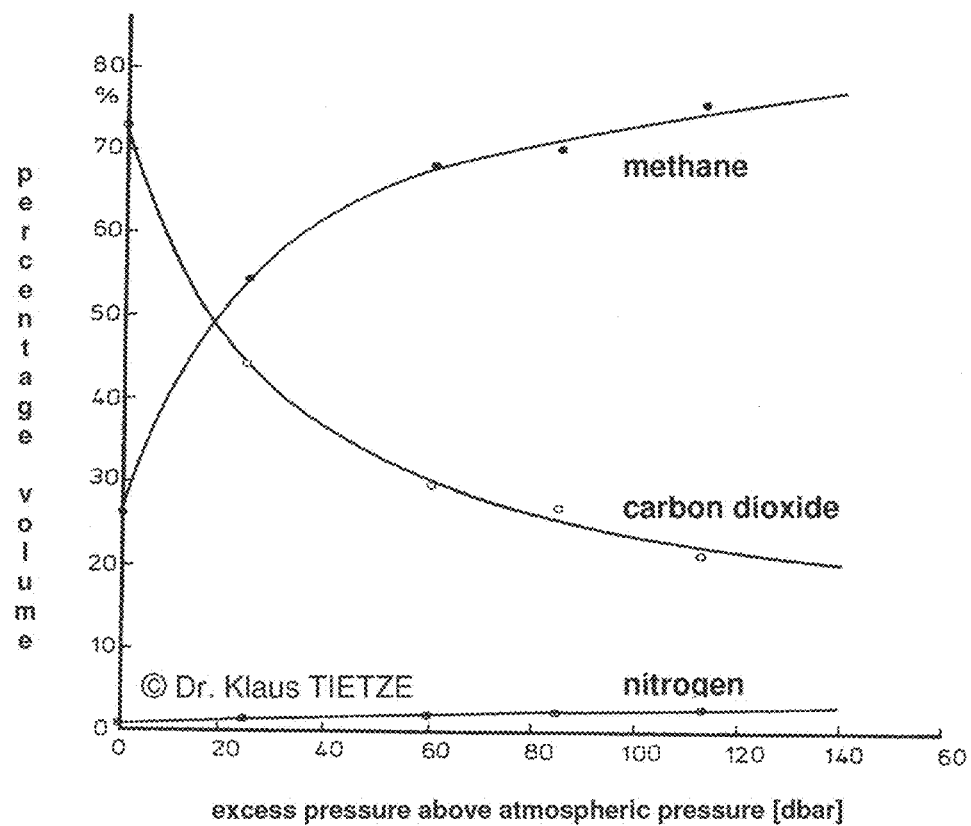
Figure 9C:
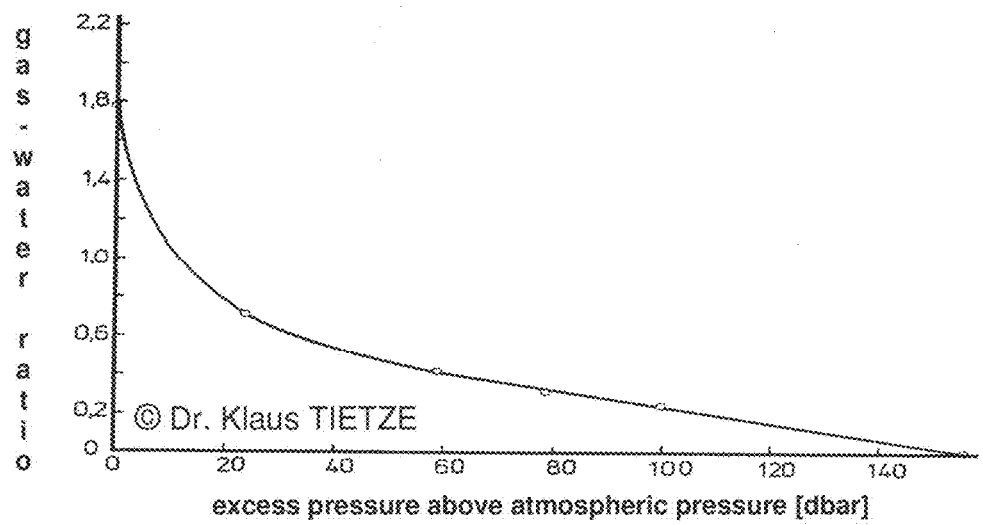
Figure 9D:
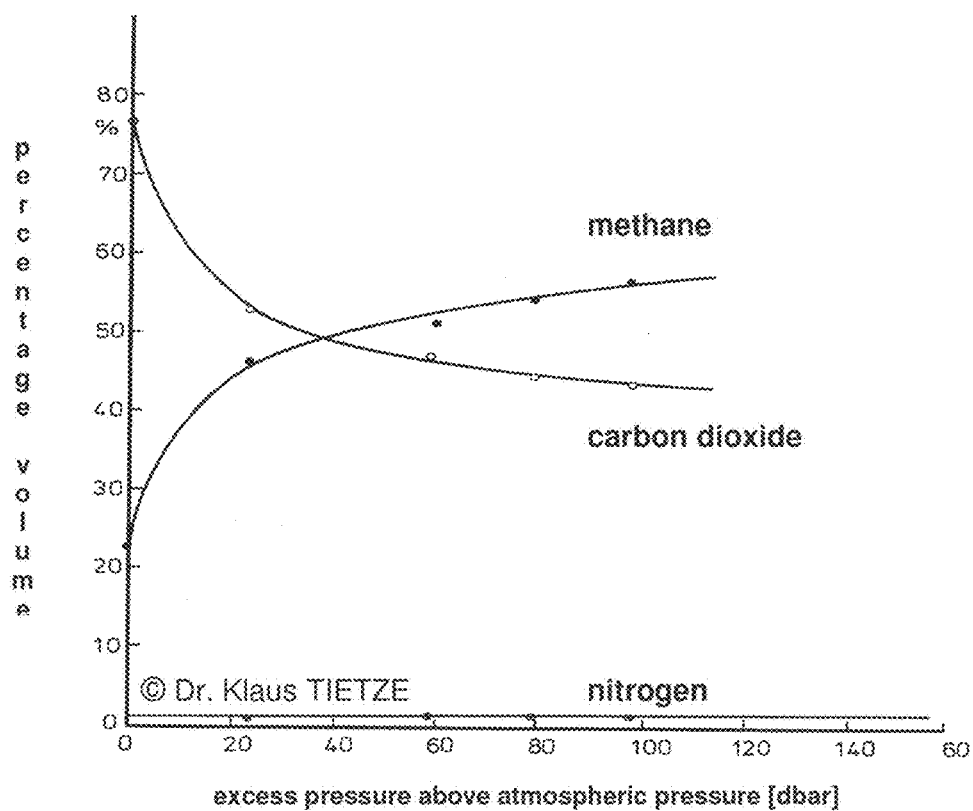

FIGS. 9A, 9B, 9C and 9D provide an experimental example of the gas composition separation effect the invention is based upon in respect of its first gas flux splitting aspect via a bubble trap as illustrated in FIG. 1. These figures are provided to present degassing data from two Lake Kivu source depths. FIGS. 9A and 9B show data at 320 meters source depth and FIGS. 9C and 9D show data at 450 meters source depth. These figures derive from the work and reports of Dr Klaus Tietze. The subfigures are from Tietze (2000), reproducing originals from Tietze and Maier-Reimer (1977). FIGS. 9A and 9C report gas/water volume ratios at STP obtained for step-wise degassed gas at specific pressures given in units of dbar. These decibar units correspond reasonably closely (though not exactly) to Lake Kivu water depth in meters. FIGS. 9B and 9D show gas composition data for methane and carbon dioxide (and for trace $N_2$). It is clear from these graphs that degassing at depth provides methane that is substantially separated from $CO_2$ such that bubble-trapping of an ascending degassing flow can provide methane-enriched "sidestream" compositions as described herein. Particulars for any specific application can be developed by modeling evaluated by experimental testing of gas compositional separations in dynamic degassing flows. Such work in relation to the design engineering of specific equipment designs may be completed by persons of average skill in the art of Lake Kivu gas extraction, and in overlapping fields of chemical engineering involving degassing of fluids in dynamic depressurizing flows. Note that both $CH_4$ and $CO_2$ degassing should be measured in order to determine differences with respect to computational modeling estimates in respect of kinetic effects and non-ideality in equilibrium gas/water solution partitioning relating to particulars of water chemistry. Degassing kinetics also may be modified by degassing catalysis methods and systems as detailed in the inventor's disclosure U.S. Pat. No. 9,732,671.

Figure 10:
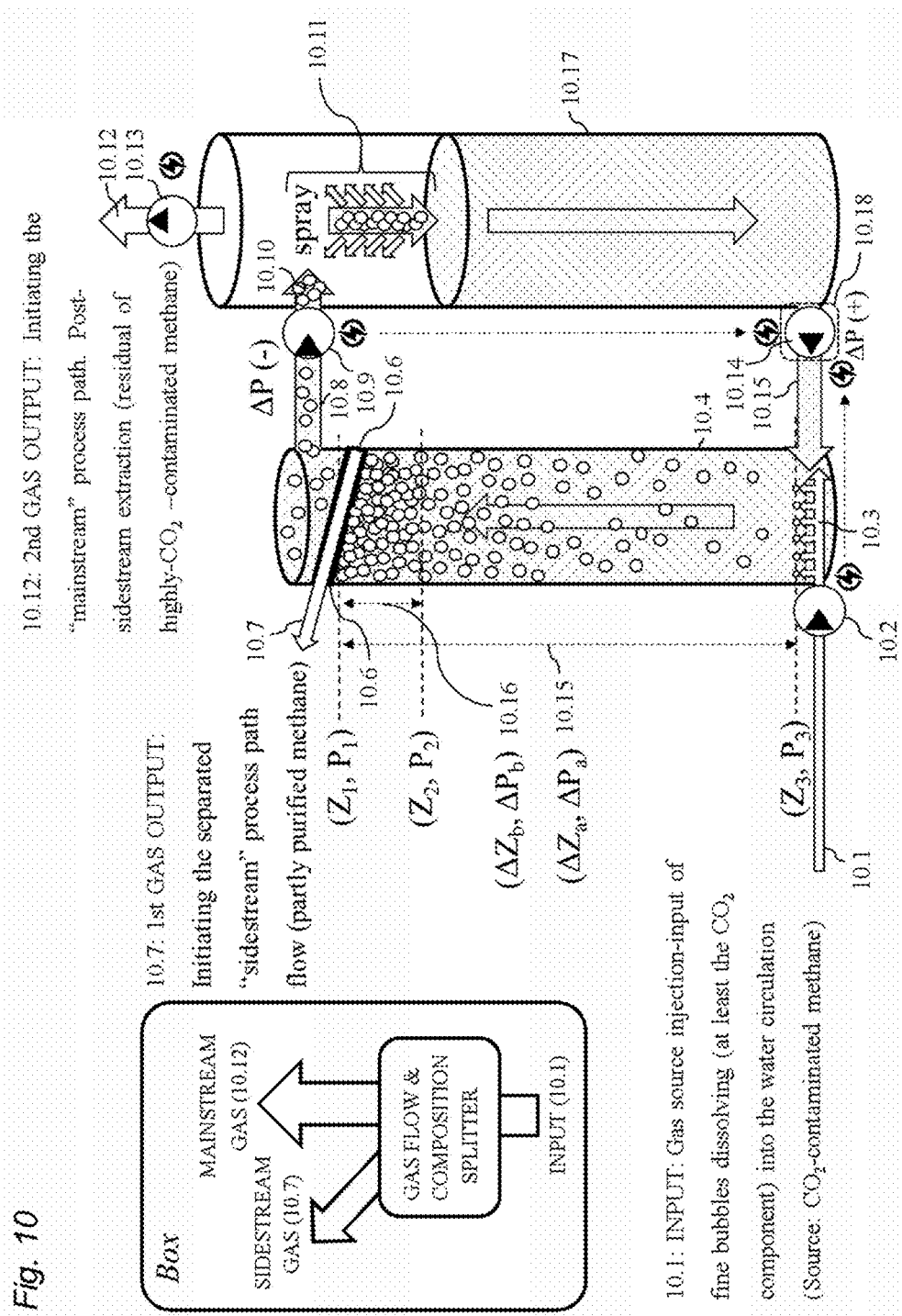
FIG. 10 is a schematic view in a vertical plane illustrating the gas-separating process of the first process path splitting with special interest to applications different from Lake Kivu, including especially on-land applications. The Box shows a simplified representation of input-to-outputs.

FIG. 10 illustrates aspects of practice of the invention with lesser vertical extension than shown in FIGS. 1 and 5 (where depressurization through the water column proceeds with upward flow from a source depth up to the near-surface environment as appropriate for Lake Kivu application, as shown in FIG. 1, and also as can be practiced broadly analogously offshore, as shown in FIG. 5). What is illustrated in FIG. 10 is a mode of preferred embodiment that especially is suitable for, and favorable to, on-land practice of the invention. As illustrated, most of the vertical extension of the contained-enclosed gas-processing water column shown (contained within a shell structure: 10.4) that accepts gas injection (10.1) into an upward water flow, has been avoided. Avoidance of a full vertical water column (that is, as shown in FIG. 1 and FIG. 5) has been by means, initially, of pressurization by a pump (10.14) pressurizing and injecting circulating water into the bottom of the gas-processing-separation chamber (10.4) in coincidence with gas injection (10.3, shown illustrating injection by small bubbles). A step-like depressurization path (10.8, 10.10, which may if/as desired drive a non-combustive flow-based power generator: 10.9) is illustrated. (Water flow upward is shown by an upward arrow. A stipple pattern represents water with degassing bubbles drawn in.) Separation of a "sidestream" gas flux (10.7) is by means of a bubble trapping gas-water separating sub-method and/or sub-system (10.6) in a manner broadly identical as detailed for preferred embodiments of the Lake Kivu type, as illustrated in FIG. 1, and the Lake-Kivu-like type, as illustrated in FIG. 5. Depressurization (at entry point 10.10) creates degassing (10.11) in a chambered space, as shown, in the upper sector of a degassing (top part) and return flow (bottom part with water indicated by stipple pattern, and gas indicated by its absence) chamber (10.17). Degassing (10.11) of "mainstream" gas (10.12) may be by step-depressurization to a pressure near to atmospheric pressure. Or if/as desired, it may be assisted by vacuum pumping (10.13) applied for pumping-capture of degassed "mainstream" gas (10.12). (Vacuum pumping minimizes "slip" loss of methane.) Flow devices that involve power (as indicated by small lightning icons within circles) are shown as circles containing triangles (according to engineering symbol conventions). Circles with outward-pointing arrows indicate flow pumping with pressurization: 10.2 for return flow water injection (10.15), and 10.13 for optional application of vacuum pumping-out of "mainstream" degassed gas (10.12). These pumping devices require input power. Circles with inward-pointing arrows (10.2, 10.9) indicate depressurization stage devices within pipe systems. These may be used to produce power, for example by flow through a rotary turbine device spinning an electric power generator. As shown by dashed arrows pointing towards item/device 10.14, depressurizing devices (10.2 and 10.9) have potential to generate power outputs that may be used for (or to supplement) power inputs needed to run pumping-compression devices (e.g., 10.14, with 10.13 being another device requiring power input). The Box illustrates the most general gas flow and composition "splitting" of the first splitting aspect of the invention.

FIG. 10 additionally illustrates a further means of avoiding some of the vertical extent of the invention (that is according to other modes of application, such as shown in FIG. 1 and in FIG. 5), using, as these modes do, gradient differences in pressure caused by water column mass compression. The water column z-distance in these modes is large in that it spans from some gas-dissolution-appropriate depth all the way up to the surface, or the near surface. Therefore, for on-land practice especially it is useful to consider variations. In FIG. 10, horizontal dashed lines indicate vertical (Z) positioning at positions $Z_1$, $Z_2$ and $Z_3$, with corresponding pressures, $P_1$, $P_2$ and $P_3$, where the location $Z_1$, $P_1$, is set to a pressure desired for specific particulars determinative of a specific gas flux and compositional "splitting" by bubble-trapping sub-methods and/or sub-systems relative to some specified gas input composition and concentration level at some input-dissolution depth. For a Lake Kivu circumstance (data as in FIGS. 9A, 9B, 9C and 9D), $Z_1$ might range from, say, roughly 70 to 40 meters depth. As shown, the gas input and waterflow rate is set to provide full dissolution of gas upon input at location $Z_3$, $P_3$. For a Lake Kivu circumstance (FIGS. 9A-9D), this depth might range from ~140 meters to ~160 meters as indicated by the data represented in the upper graph panels in FIGS. 9A-9D. As shown, therefore, the difference "delta" of vertical distance and pressure, $\Delta Z_a$, $\Delta P_a$, (10.15) for a Lake Kivu circumstance could be a vertical distance, $\sim \Delta Z$, as large as 120 meters. This would be an unattractively large containing structure for implementation on land. There is no necessity in the method, however, for gas injection under conditions of full gas dissolution into the water flow. The position, $Z_2$, $P_2$, for example indicates a possible injection position at a much higher position vertically. The $Z_2$ level, if used for gas injection, indicates a much smaller vertical span design for operational distance, $\Delta Z_b$, $\Delta P_b$, (10.16), relative to $\Delta Z_a$, $\Delta P_a$, (10.15). For gas (and circulating water) injection at such a position ($Z_2$), as shown, rising bubbles, especially if injected as microbubbles, can (depending on size, residence time, temperature and other particulars) transform their internal gas composition by cross-phase gas-water diffusive exchange, transferring a portion of their composition of $CO_2$ from gas into the water phase prior to bubble-trapping by the bubble-trapping method and/or system indicated (10.6). Such a situation is a preferred embodiment of the invention in application to the first gas process path separation—"splitting". This consideration and teaching provides a means for efficient practice of the invention on land. For practical application of the method and/or system shown, however, for either avoidance of large vertical Z extensions above the bubble-trapping level ($Z_2$, $P_2$), and/or additionally for avoidance of substantially large vertical distance below the same level, specific design modeling and testing is required in order to select desired parameters for operational unit sizes, flow rates, pressures, temperature-dependencies, bubble injection sizes and exchange kinetics, etcetera. Specific determinations in such matters may be made by persons of average skill in the art of chemical engineering plant design, testing and construction in areas of expertise such as, for example, biogas upgrading using pressurized water, and similar fields. Also, in the absence of a static-pressurized vertical water column (as shown for FIG. 10, item 10.17), water pressurization for transfer (10.15) entry of recirculating flow into the bottom of chamber 10.4 can proceed more efficiently than by a simple pump as indicated symbolically as item 10.14. The non-compressibility of water (or other $CO_2$-absorbing fluids) allows power-efficient compression to a desirable pressure ($\Delta P+$, as shown) by utilization of multiple piston-type fluid compression chambers operating in cycle-sequence, rather than by a simple pump driving a pressure transition. For simplicity in representation, such an improvement is not illustrated in FIG. 10. A dashed box labeled 10.18 surrounding item 10.14 indicates consideration of this matter. Sub-methods and/or sub-systems of power-efficient water/fluid compressions of this or other types may be determined and implemented by persons of average skill in chemical engineering design and construction developing sub-methods and/or sub-systems for fluids transfer involving pressurization transitions.

While the invention has been described in detail and with reference to specific examples thereof, it will be apparent to one skilled in the art that various changes and modifications can be made therein without departing from the spirit and scope thereof.

REFERENCES CITED

1. Allam, R., Martin, S., Forrest, B., Fetvedt, J., Lu, X., Freed, D., Brown, G. W. Jr., Sasaki, T., Itoh, M., and Manning, J., (2017). Demonstration of the Allam Cycle: An update on the development status of a high efficiency supercritical carbon dioxide power process employing full carbon capture. Energy Procedia, 114: 5958-5966.
2. Antares Offshore LLC, website: http://www.antaresoffshore.com/projects.php (showing an engineering diagram: http://www.antaresoffshore.com/images/kivuwatt-large.jpg; http://www.antaresoffshore.com/images/floaterimage6.jpg)
3. Ausfelder, F., et al., (2017). Energy storage as part of a secure energy supply. ChemBioEng Reviews 4(3): 144-2010, available online: https://onlinelibrary.wiley.com/doi/full/10.1002/cben.201700004
4. Ausubel, J., (2004). Big Green Energy Machines. The Industrial Physicist, October-November, pp. 20-24. Online: https://phe.rockefeller.edu/docs/BigGreen.pdf
5. Bahr, M., Diaz, I., Dominguez, A., Gonzalez Sanchez, A., and Munoz, R., (2014). Micro-algal-Biotechnology As a Platform for an Integral Biogas Upgrading and Nutrient Removal from Anaerobic Effluents. Environ. Sci. & Technol., 48: 573-581
6. Batubara, M., Purwanto, W. W. and Fauzi, A., (2015). Application of fiscal incentives for development of East Natuna Gas Field for long-term natural gas demand Makara J. Technol. 19/2, pp. 65-72 (available online).
7. Bikumu F. R., (2005). La problematique du deficit energetique dans la sous region des Grands-Las africains. (Online. Pole Insitute)
8. Budzianowski, W. M., Wylock, C. E., Msrciniak, P. A., (2017). Power requirements of biogas upgrading by water scrubbing and biomethane compression: Comparative analysis of various plant configurations. Energy Conversion and Management, 141: 2-19
9. Capart, A., Godfrine, A., and Kufferath, J. (1957-1958). Le Gaz Methane du Lac Kivu. Ministere du Congo Beige et du Ruanda-Urundi, Zaire et Rwanda. Silent film. Titles in French.
10. Chang, H. M., Chung, M. J., and Park, S. B., (2010). Integrated cryogenic system for CO2 separation and LNG production. CP1218, Advances in Cryogenic Engineering: Transactions of the Cryogenic Engineering Conference—CEC, v. 53, pp. 278-285, edited by J. G. Weisend II. Available online: http://manager.campushomepage.com/users/hicel/download/1-48.pdf
11. CO2CRC Technologies Pty Ltd., (2010). Assessment of the capture and storage potential of CO2 co-produced with natural gas in South-East Asia. APEC. Available online: https://hub.globalccsinstitute.com/publications/assessment-capture-and-storage-potential-co2-co-produced-natural-gas-south-east-asia/62-natuna-discovery
12. Conca, J., (2019). Net Zero Natural Gas Plant—The Game Changer. Forbes. July 31. www.forbes.com/sites/jamesconca/2019/07/31/net-zero-natural-gas-plant-the-game-changer/#3cd6b0ea1de2
13. Contour Global website, KivuWatt: http://www.contour-global.com/asset/kivuwatt Videos: https://vimeo.com/74334165; https://www.youtube.com/watch?v=N3PHPHyRxjE.
14. Descy, J-P., Darchambeau, F., Schmid, M., 2012 (editors). Lake Kivu: Limnology and Biochemistry of a Tropical Great Lake. Springer. 192 pp.
15. Fachverband Biogas e.V. & UNIDO (2017). Biogas to Biomethane. (Authors: D. Wilken et al.,) Report, pp. 68, online: www.biogas-to-biomethane.com/Download/BTB.pdf
16. Fazlollahi, F., Saeidi, S., Safdari, M.-S., Sarkari, M., Klemes, J. J., and Baxter, L. L., (2017). Effect of operating conditions on cryogenic carbon dioxide removal. Energy Technology, 5: 1588-1598
17. Ferrari, N., Mancuso, L., Davision, J., Chiesa, P., Martelli, E., and Romano, M. C., (2017). Oxy-turbine Power Plant with CO2 capture. Energy Procedia, 114: 471-480. Online: www.sciencedirect.com/science/article/pii/S1876610217313656
18. Halbwachs, Michel. Website: http://mhalb.pagesperso-orange.fr/kivu/eg/index.htm
19. Henni, A. (2014). Technology could cut CO2 cost sharply for enhanced oil recovery. JPT: Journal of Petroleum Technology, June 2014 technology update (Online: http://www.spe.org/jpt/article/6427-technology-update-21/)
20. Issa, Ohba, T., Fantong, W., et al. (2013). Contribution of methane to total gas pressure in deep waters at lakes Nyos and Monoun (Cameroon, West Africa). Geochemical J., v. 47: 349-362.
21. Kapteijn, P. K., Kutscha, E., and Perron, J., (2012). A Breakthrough Oxy-Fuel Technology for Cost-Effective $CO_2$-Enhanced Oil Recovery. Paper SPE 162541 presented at the Abu Dhabi International Petroleum Exhibition and Conference, Abu Dhabi, UAE, 11-14 November. (https://www.onepetro.org/conference-paper/SPE-162541-MS Also a slide deck: http://members.igu.org/old/IGU%20Events/igrc/igrc2011/igrc-2011-proceedings-and-presentations/oral-presentations/c/OP_C_2_Pieter_Kapteijn.pdf)
22. Kling, G., MacIntyre, S., Steenfelt, J. S., and Hirslund, F., (2006). Lake Kivu Gas Extraction. Report on Lake Stability. http://www.fonaredd-rdc.org/wp-content/uploads/2017/07/Kling_2006_Lake_Kivu_Gas_Extraction.pdf
23. Malmberg (Swedish company) website, various undated items: www.malmberg.se/en-us/What-we-do/Biogas/Biogas-upgrading www.malmberg.se/en-us/What-we-do/Biogas/Malmberg-COMPACT www.malmberg.se/Portals/malmbergs/Malmberg%20Biogas%20UK%202019_1.pdf
24. Marin, D., Ortiz, A., Diez-Montero, R., Uggetti, E., Garcia, J., Lebrero, R., and Munoz, R., (2019). Influence of liquid-to-biogas ratio and alkalinity on the biogas upgrading performance in a demo scale algal-bacterial photobioreactor. Bioresource Technol., 280: 112-117
25. Maqsood, K., Mullick, A., Ali, A., Kargupta, K., and Ganguly, S., (2014). Cryogenic carbon dioxide separation from natural gas: a review based on conventional and novel emerging technologies. Rev. Chem. Eng., v. 30 (5): 453-477.
26. McMahon, J., (2019). Multiple Zero-Carbon Natural-Gas Plants Planned At Lower Cost Than Conventional Plants. Forbes. July $23^{rd}$. Online: www.forbes.com/sites/ jeffmcmahon/2019/07/23/net-power-developing-multiple-zero-carbon-natural-gas-plants-exec-says/#2683e8d98ac2
27. Mills, M. P., (2018). The Real Fuel of the Future: Natural Gas. Manhattan Institute (report). Pp. 20. Online: www.manhattan-institute.org/html/real-fuel-future-natural-gas-11467.html
28. Munoz, R., Meier, L., Diaz, I., and Jeison, D., (2015). A review of state-of-the-art of physical/chemical and biological technologies for biogas upgrading. Rev. Environ. Sci. Biotechnol., 14: 727-759
29. NET Power. Online slide deck presentations: May 2016 "NET Power. Truly Clean, Cheaper Power," www.usea.org/sites/default/files/media/Net%20Power%20USEA%20Presentation_FI NAL.pdf; September 2016 "NET Power Truly Clean, Cheaper Energy," https://naseo.org/Data/Sites/1/net-power-ppt—naseofg-9.9.16.pdf; October 2016, "NET Power. Truly Clean, Cheaper Energy," www.cslforum.org/cslf/sites/default/files/documents/tokyo2016/Nomoto-NETPower-Project-PIRT-Tokyo1016.PDF; October 2016 Stanford "NET Power. Truly Clean, Cheaper Energy," https://ngi.stanford.edu/sites/default/files/3_Brown_NET_Power_0.pdf; May 2017 "NET Power. Truly Clean, Cheaper Energy" http://e4carolinas.org/wp-content/uploads/2017/05/David-Freed-NET-Power-Energy-Inc-May-2017.pdf; Jul. 19, 2017 "NET Power. Truly Clean, Cheaper Energy," https://www.aiche.org/sys tem/files/aiche-proceedings/conferences/404771/papers/506212/P506212.pdf; October 2017 "Allam Cycle. Truly Clean, Cheaper Energy," www.energynd.com/wp-content/uploads/2012/04/Bill-Brown-Presentation.pdf; Dec. $1^{st}$ 2017 "Allam Cycle Coal—A New Clean Coal Power Cycle," www.usea.org/sites/default/files/event-/Friday%20-%20EN%20-%208%20Rivers_CCIF%202017%20final.pdf; Dec. 4th, 2017 "NET Power. Truly Clean, Cheaper Power" www.co2conference.net/wp-content/uploads/2017/12/6-NET-Power_CO2-Workshop_04-Dec-17.pdf March 2018 "NET Power. Truly Clean, Cheaper Power" URL; September 2018 NET Power. Truly Clean, Cheaper Energy" https://www.icef-forum.org/pdf2018/program/cs2/Presentation_Hideo_Nomoto_181016.pdf and http://www.sco2symposium.com/www2/sco2/papers2018/turbomachinery/081_Pres.p df
30. Okereke, C., and Tyldesley, S., (2011). Low-Carbon Africa: Rwanda. Smith School of Enterprise and the Environment, Oxford University, online report: https://www.christianaid.org.uk/sites/default/files/2017-08/low-carbon-africa-rwanda-november-2011.pdf
31. Osterdijk, H. and Hoencamp, T. (2012). Lake Kivu: Turning threat into prosperity. TCE, The Chemical Engineer, issue 852, June 2012, pp: 32-35. Available online: http://www.infrassure.com/images/uploads/user/TCE852kivuenergy.pdf
32. Pasche, N. T., Mugisha, A., Rwandekwe, L., and Umutoni, A., (2010). Monitoring the effects of methane extraction in Lake Kivu. MININFRA Report, Kigali, Rwanda. (www.lake-kivu.org/sites/default/files/Monitoring%20annual%20report%202010_final_0.pdf)
33. Patel, S., (2019). 300-MW Natural Gas Allam Cycle Power Plant Targeted for 2022. www.powermag.com/300-mw-natural-gas-allam-cycle-power-plant-targeted-for-2022/
34. Penkuhn, M. and Tsatsaronis, G., (2016). Exergy analysis of the Allam Cycle. $5^{th}$ Int. Symp. Supercritical CO2 Power Cycles, Mar. 28-31, 2016, San Antonio, Tex. Online: www.sco2symposium.com/papers2016/OxyFuel/040paper.pdf
35. Rodero, M. del R., Lebrero, R., Serrano, E., Lara, E., Arbib, Z., Garcia-Encina, P. A., and Munoz, R., (2019). Thechnology validation of photosynthetic biogas upgrading in a semi-industrial scale algal-bacterial photobioreactor. Bioresource Technol., 279: 43-49
36. Rosen, J. W., (2015) Lake Kivu's great gas gamble. Technology Review, Apr. 16th, 2015. (http://www.technologyreview.com/photoessay/536656/lake-kivus-great-gas-gamble/)
37. Ross, K. A., (2013a). PhD Thesis (ETH-Zurich). The Effect of Subaquatic Volcanism on the Structure of Lake Kivu in the Albertine Rift, East Africa.
38. Rwanda Water and Forestry Authority, (2017). Forest Investment Program For Rwanda. (pp. 144) Online: www.climateinvestmentfunds.org/sites/cif_enc/files/fip_final_rwanda.pdf
39. Scaccabarozzi, R., Gatti, M., and Martelli, E., (2017). Thermodynamic optimization and part-load analysis of the NET Power Cycle. Energy Procedia, 114: 551-560. Online: www.sciencedirect.com/science/article/pii/S1876610217313735
40. Schmid, M., Tietze, K., Halbwachs, M. Lorke, A., McGinnis, D., and A. Wiest, A., (2004). How hazardous is the gas accumulation in Lake Kivu? Arguments for a risk assessment in light of the Nyiragongo Volcano eruption of 2002, Acta Vulcanol., 14/15, 115-421.
41. Schmid M, Halbwachs M, Welirli B, and Wuest A., (2005). Weak mixing in Lake Kivu: New insights indicate increasing risk of uncontrolled gas eruption. G3 Research Letter 6: Q07009,
42. Smil, V., (2005). Creating the Twentieth Century: Technical Innovations of 1867-1914 and Their Lasting Impact. Oxford Univ. Press, pp. 368.
43. Smil, V., (2006). Transforming the Twentieth Century: Technical Innovations and Their Consequences. Oxford Univ. Press, pp. 368.
44. Smil, V., (2010). Prime Movers of Globalization: The History and Impact of Diesel Engines and Gas Turbines. MIT Press, pp. 272.
45. Smil, V., (2015). Natural Gas: Fuel for the $21^{st}$ Century. Wiley, pp. 264.
46. Stranges, A. N., (1984). Friedrich Bergius and the Rise of the German Synthetic Fuel Industry. Isis, 75(4): 642-667.
47. Tassi, F., Vaselli, O., Tedesco, D., Montegrossi2 G., Darrah,T., Cuoco, E., Mapendano, M. Y., Poreda, R., Delgado Huertas, A., (2009). Water and gas chemistry at Lake Kivu (DRC): Geochemical evidence of vertical and horizontal heterogeneities in a multibasin structure. G3: Geochemistry, Geophysics, Geosystems, v. 10(2), DOI: 10.1029/2008GC002191
48. Tietze, K., (1978). Geophysikalische Untersuchungen des Kivusees und seiner ungewohnlichen zur Methangaslagerstatte—Schichtung, Dynamik und Gasgehalt des Seewassers. (Doctoral) Dissertation Christian-Albrechts-Universitat Kiel. 149 pp.
49. Tietze, K., (1980a). The Genesis of the Methane in Lake Kivu (Central Africa). Geologische Rundschau, v. 69(2): 452-472.
50. Tietze, K., (1980b). The Unique Methane Gas Deposit in Lake Kivu (Central Africa)—Stratification, Dynamics, Genesis and Development. In: Unconventional Gas Recovery Symposium, SPE/DOE8957 (Society of Petroleum Engineers), pp. 275-288.

51. Tietze, K. (2000). Lake Kivu Gas Development and Promotion-Related Issues: Safe and Environmentally Sound Exploitation. Final Report to the Ministry of Energy, Water and Natural Resources Unit for Promotion and Exploitation of Lake Kivu Gas. (Online available.)
52. Tietze, K. (2007). Basic plan for monitoring, regulating and steering exploitation of the unique methane gas deposit in Lake Kivu: Safely, Environmentally soundly and with optimal yield. Copyright, PDT GmbH/Dr Klaus Tietze, Celle, Germany. 201 pages.
53. Tietze, K. and Maier-Reimer, E., (1977). Recherches Mathématiques-Physiques pour la Mise en Exploitation du Gisement de Gaz Méthane dans le Lac Kivu (Zaïre/Rwanda). Report No 76003, Bundesanstalt für Geowissenschaften und Rohstoffe, 2 Volumes, Hanover, 180 pp.
54. Tollefson, J., (2018). Zero-emissions plant begins key tests. Nature, 557: 622-623
55. Vaselli, O., Tedesco, D., Cuoco, E., and Tassi, F., (2015). Are limnic eruptions in the $CO_2$—$CH_4$-rich gas reservoir of Lake Kivu (Democratic Republic of the Congo and Rwanda) possible? Insights from physico-chemical and isotopic data. Pp. 489-505 in: D. Rouwet et al., (eds.), *Volcanic Lakes*, Advances in Volcanology, Springer-Verlag.
56. Venkatraman, V., Evien, S., Lethesh, K. C., Rai, J. J., Knuutila, H. K., and Fiksdahl, A., (2019). Rapid, comprehensive screening of ionic liquids towards sustainable applications. Sustainable Energy & Fuels, 3: 2798-2808
57. Wuest, A., Jarc, J., Schmid, M., (2009). Modelling the reinjection of deep-water after methane extraction in Lake Kivu. EAWAG Report (Kastanienbaum, Switzerland) (Available online on Researchgate.)
58. Wuest, A., Jarc, L., Burgmann, H., Pasche, N. and Schmid, M., (2012). Methane Formation and Future Extraction in Lake Kivu. In: J.-P. Descy et al. (eds.), *Lake Kivu: Limnology and Biochemistry of a Tropical Great Lake*. Aquatic Ecology Series v. 5. Springer.
59. Wylock, C., and Budzianowski, W. M., (2017). Performance evaluation of biogas upgrading by pressurized water scrubbing via modelling and simulation. Chem. Eng. Sci., 170: 639-652

What is claimed is:

1. A gas separation and utilization method comprising:
    providing an ascending flow of a liquid containing carbon dioxide gas and methane gas;
    extracting at least a fraction of the methane gas from the liquid to provide a methane enriched gas;
    extracting at least a fraction of the carbon dioxide gas from the liquid to provide a carbon dioxide enriched gas, which is extracted from the ascending flow of the liquid downstream of the methane enriched gas;
    collecting the methane enriched gas;
    feeding the carbon dioxide enriched gas as a fuel into an oxyfuel power generation system, which uses supercritical carbon dioxide as a working fluid;
    generating power from the oxyfuel power generation system; and
    expelling an exhaust from the oxyfuel power generation system, wherein the exhaust comprises carbon dioxide and water vapor.

2. The method of claim 1, wherein the extracting at least a fraction of the methane gas comprises conveying the liquid through a bubble trapping device to collect gas bubbles comprising the methane enriched gas.

3. The method of claim 1, wherein the liquid is water extracted from a body of water and contains carbon dioxide gas and methane gas at a molar $CO_2/CH_4$ ratio greater than 2.

4. The method of claim 1, wherein the carbon dioxide enriched gas has a molar $CO_2/CH_4$ ratio greater than 5.

5. The method of claim 1, wherein the liquid comprises water in a closed loop circulation device to which a gaseous mixture containing methane and carbon dioxide is added and wherein more than half of the carbon dioxide is dissolved in the liquid.

6. The method of claim 1, wherein the methane enriched gas has a $CO_2/CH_4$ molar ratio less than or equal to 1.

7. The method of claim 1, further comprising at least one further extraction step wherein solid carbon dioxide is extracted from the methane enriched gas at a refrigeration temperature sufficiently low to form solid carbon dioxide.

8. The method of claim 1, wherein the method is conducted in a system in electrical communication with an external power grid and the system is controlled to direct power into fuel production and storage when demand from the external power grid is below a minimum demand level or when an irregular renewable power input is at or above a minimum input level, and to direct power to the external power grid when demand from the external power grid is at or above the minimum demand level or when the irregular renewable power input is below the minimum input level.

9. The method of claim 8, further comprising transforming electric power from the external power grid into a fuel selected from the group consisting of methane, methanol, hydrogen and formic acid.

10. The method of claim 1, wherein the method is conducted in a system in electrical communication with an external power grid, wherein: (a) the system includes at least one integrated cryogenic facility configured to: i) cryogenically separate air to obtain liquid oxygen and liquid nitrogen; ii) cryogenically separate carbon dioxide from a gas containing methane and carbon dioxide to obtain purified methane and purified carbon dioxide; iii) optionally cryogenically transform purified methane into liquefied natural gas; iv) optionally produce power utilizing cold energy stored in cryogenically liquefied gases by processes of heat exchange and by use of gas flow turbine power generators; v) modulate between power intake for cryogenic processing and power production utilizing stored cold energy, said modulation enabling storing power from, and providing power output to, the external power grid according to need.

11. A gas separation and utilization method comprising:
    providing ascending flow of a liquid containing carbon dioxide gas and methane gas;
    extracting at least a fraction of the methane gas from the liquid to provide a methane enriched gas;
    extracting at least a fraction of the carbon dioxide gas from the liquid to provide a carbon dioxide enriched gas, which is extracted from the ascending flow of the liquid downstream of the methane enriched gas;
    collecting the methane enriched gas;
    feeding the carbon dioxide enriched gas as a fuel into an oxyfuel power generation system;
    generating power from the oxyfuel power generation system;
    expelling an exhaust from the oxyfuel power generation system, wherein the exhaust comprises carbon dioxide and water vapor; and
    extracting solid carbon dioxide from the methane enriched gas at a refrigeration temperature sufficiently low to form solid carbon dioxide by (a) bubbling the methane enriched gas upwards in liquefied natural gas (LNG); (b) extracting the solid carbon dioxide from the LNG; and (c) collecting LNG generated as an increase in LNG volume generated by LNG condensed from the methane enriched gas.

12. The method of claim 11, further comprising selectively storing LNG collected, exporting LNG collected, combusting LNG collected, combusting previously stored LNG and/or combusting purified methane gas so as to provide variable power output.

13. The method of claim 11, further comprising splitting the methane enriched gas into at least two different process streams comprising: (a) a first process stream comprising power-generating combustion of methane; and (b) a second process stream comprising production of a purified methane product, and at least one of storage and distribution of the purified methane product.

14. A gas separation and utilization method comprising:
providing an ascending flow of a liquid containing carbon dioxide gas and methane gas;
extracting at least a fraction of the methane gas from the liquid to provide a methane enriched gas;
extracting at least a fraction of the carbon dioxide gas from the liquid to provide a carbon dioxide enriched gas, which is extracted from the ascending flow of the liquid downstream of the methane enriched gas;
collecting the methane enriched gas;
feeding the carbon dioxide enriched gas as a fuel into an oxyfuel generation system;
generating power from the oxyfuel generation system;
expelling an exhaust from the oxyfuel power generation system, wherein the exhaust comprises carbon dioxide and water vapor; and
extracting solid carbon dioxide from the methane enriched gas at a refrigeration temperature sufficiently low to form solid carbon dioxide by (a) bubbling the methane enriched gas upwards in a first stage liquid at a first stage temperature at which methane remains in a gaseous phase and carbon dioxide desublimates to provide solid carbon dioxide and a carbon dioxide depleted gas; (b) bubbling the carbon dioxide depleted gas upwards in liquefied natural gas (LNG); and (c) collecting LNG generated as an increase in LNG volume generated by LNG condensed from the methane enriched gas.

* * * * *

UNITED STATES PATENT AND TRADEMARK OFFICE
CERTIFICATE OF CORRECTION

PATENT NO. : 11,421,873 B2
APPLICATION NO. : 16/715352
DATED : August 23, 2022
INVENTOR(S) : Charles L. Harper, Jr.

It is certified that error appears in the above-identified patent and that said Letters Patent is hereby corrected as shown below:

In the Claims

In Claim 11 at Column 46, Lines 49-50, the wording "providing ascending flow of a liquid containing carbon dioxide gas and methane gas;" should read --providing an ascending flow of a liquid containing carbon dioxide gas and methane gas;--.

In Claim 14 at Column 48, Lines 4-6, the wording "feeding the carbon dioxide enriched gas as a fuel into an oxyfuel generation system; generating power from the oxyfuel generation system;" should read --feeding the carbon dioxide enriched gas as a fuel into an oxyfuel power generation system; generating power from the oxyfuel power generation system;--.

Signed and Sealed this
Twenty-ninth Day of November, 2022

Katherine Kelly Vidal
*Director of the United States Patent and Trademark Office*